(12) United States Patent
Douglas et al.

(10) Patent No.: US 12,037,144 B1
(45) Date of Patent: Jul. 16, 2024

(54) SPACE RAILWAY

(71) Applicant: Space Railway Corporation, Dallas, TX (US)

(72) Inventors: Kenneth Wayne Douglas, Dallas, TX (US); Donald Arthur McGregor, Lafayette, LA (US); Craig T. Bouchard, Naples, FL (US); Steven C. Griggs, Stillwater, OK (US)

(*) Notice: Subject to any disclaimer, the term of this patent is extended or adjusted under 35 U.S.C. 154(b) by 15 days.

(21) Appl. No.: 18/093,547

(22) Filed: Jan. 5, 2023

Related U.S. Application Data

(60) Provisional application No. 63/399,846, filed on Aug. 22, 2022, provisional application No. 63/299,897, filed on Jan. 14, 2022.

(51) Int. Cl.
| | | |
|---|---|---|
| *B64G 1/64* | (2006.01) | |
| *B64G 1/26* | (2006.01) | |
| *B64G 1/40* | (2006.01) | |
| *B64G 1/42* | (2006.01) | |
| *B64G 1/44* | (2006.01) | |
| *B64G 1/56* | (2006.01) | |
| *B64G 4/00* | (2006.01) | |

(52) U.S. Cl.
CPC .............. *B64G 1/648* (2013.01); *B64G 1/26* (2013.01); *B64G 1/403* (2013.01); *B64G 1/409* (2013.01); *B64G 1/421* (2013.01); *B64G 1/428* (2013.01); *B64G 1/443* (2013.01); *B64G 1/56* (2013.01); *B64G 2004/005* (2013.01)

(58) Field of Classification Search
CPC .......... B64G 1/648; B64G 1/26; B64G 1/403; B64G 1/409; B64G 1/421; B64G 1/428; B64G 1/443; B64G 1/56; B64G 2004/005
See application file for complete search history.

(56) References Cited

U.S. PATENT DOCUMENTS

| | | | |
|---|---|---|---|
| 3,820,472 A | 6/1974 | Schwarzler | |
| 6,981,674 B1 * | 1/2006 | Dempsey | B64G 1/648 |
| | | | 244/158.2 |

(Continued)

FOREIGN PATENT DOCUMENTS

| | | | | |
|---|---|---|---|---|
| CN | 105667835 A | * | 6/2016 | |
| DE | 202011106986 U1 | * | 5/2012 | ............. B64G 1/002 |

OTHER PUBLICATIONS

Josh Hrala, "Meet the 'Space Train' Concept That Can Get To Mars in 2 Days", Aug. 26, 2016, Science Alert, pp. 1 and 2 (Year: 2016).*

*Primary Examiner* — Valentina Xavier
(74) *Attorney, Agent, or Firm* — Patzik, Frank & Samotny Ltd.

(57) ABSTRACT

A space transportation system for providing high volume, high mass access to space that includes tethers that extend between the earth and one or more space stations or platforms. One or more counterweights may be utilized at the terminal end of the tethers in space. The tethers utilize may be made of carbon nanotubes or other advanced materials and woven into cables with electromagnets embedding therein. The tethers include tapering profiles along their lengths to facilitate operation of the system. Transport vehicles for passengers and cargo travel up the tethers using electromagnetic levitation and impulsion. Energy from solar panels or movement of the vehicles along the tethers may be generated for use in the system or for supplemental uses.

41 Claims, 17 Drawing Sheets

(56) References Cited

U.S. PATENT DOCUMENTS

| | | | |
|---|---|---|---|
| 7,559,508 B1* | 7/2009 | Taylor | B64G 1/002 244/172.3 |
| 7,681,840 B1* | 3/2010 | Taylor | B64G 1/62 244/172.4 |
| 10,538,857 B2* | 1/2020 | Malek | B64G 1/648 |
| 2016/0200551 A1* | 7/2016 | Izz | B66B 9/02 187/250 |
| 2024/0025570 A1* | 1/2024 | Eichbaum | B64G 1/002 |

* cited by examiner

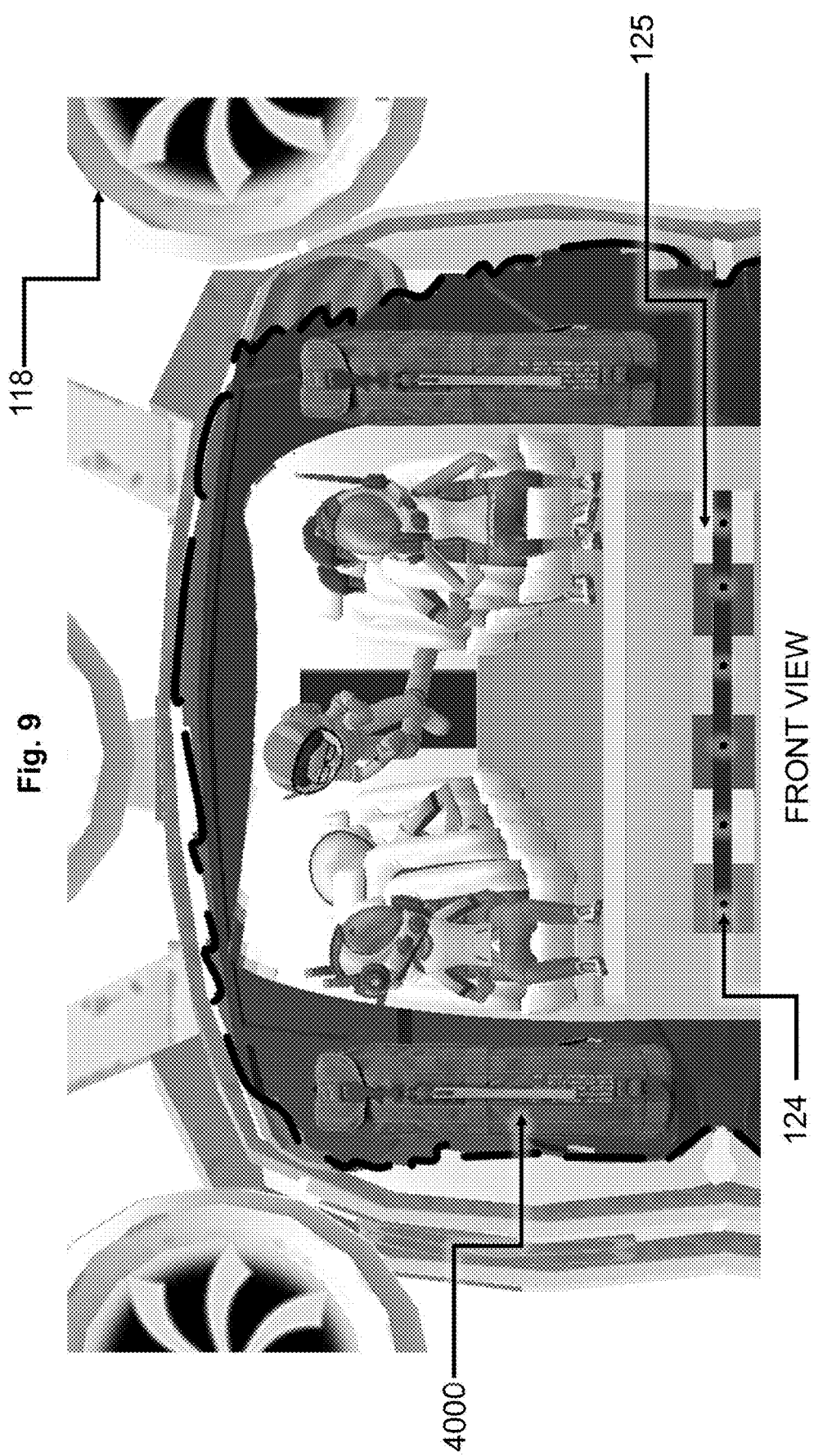

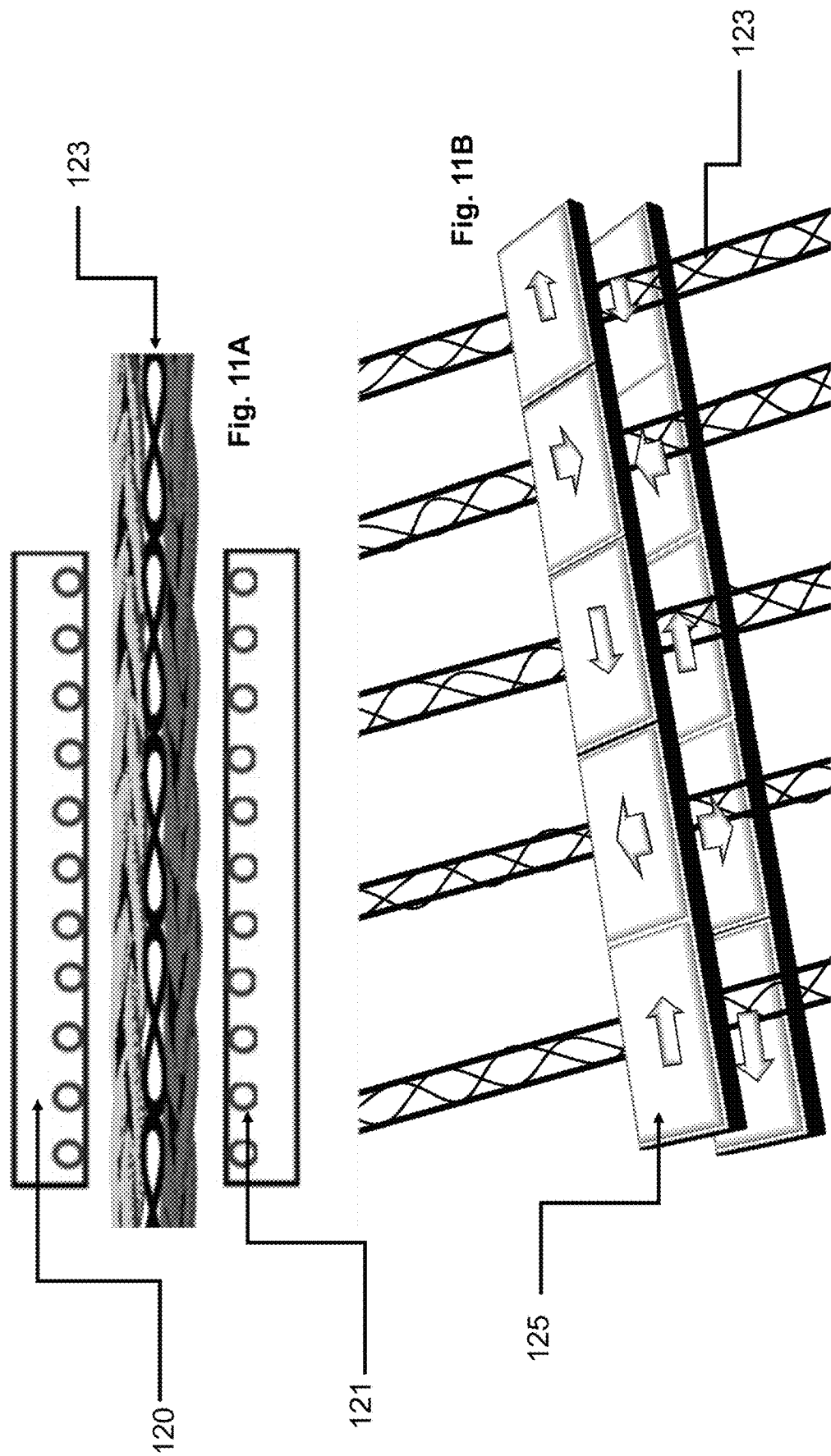

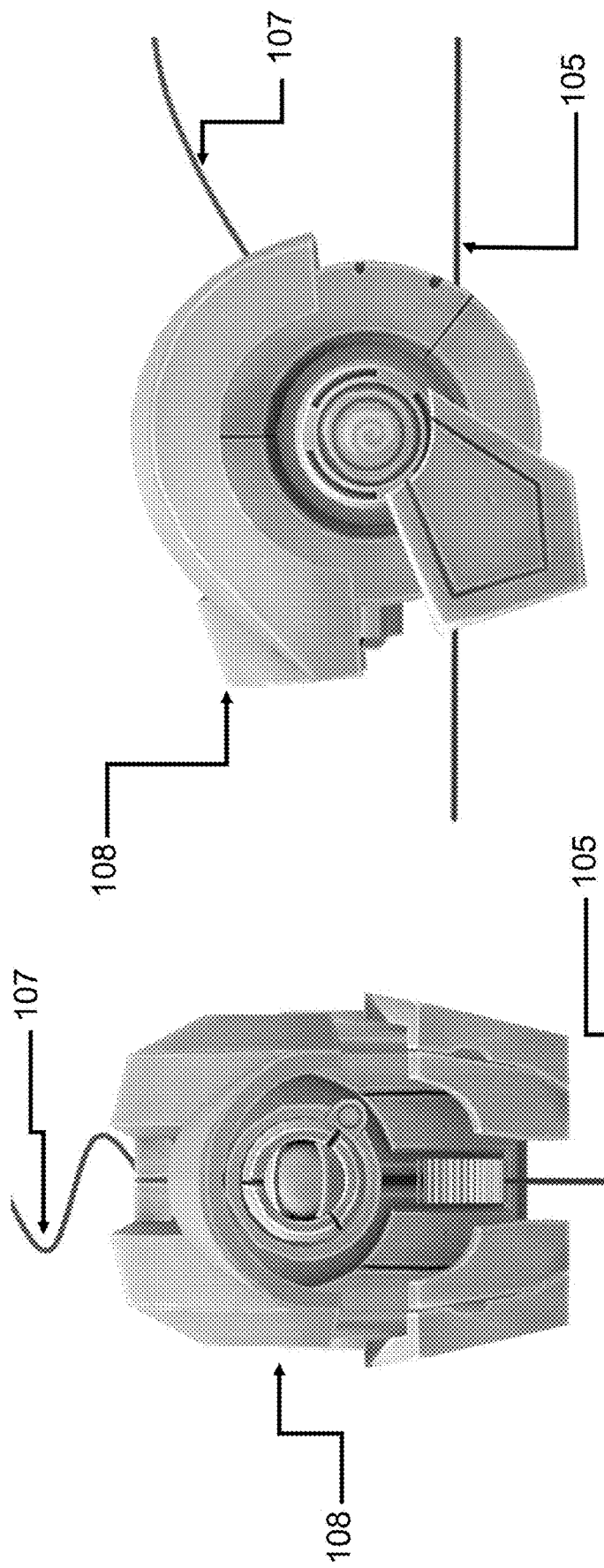

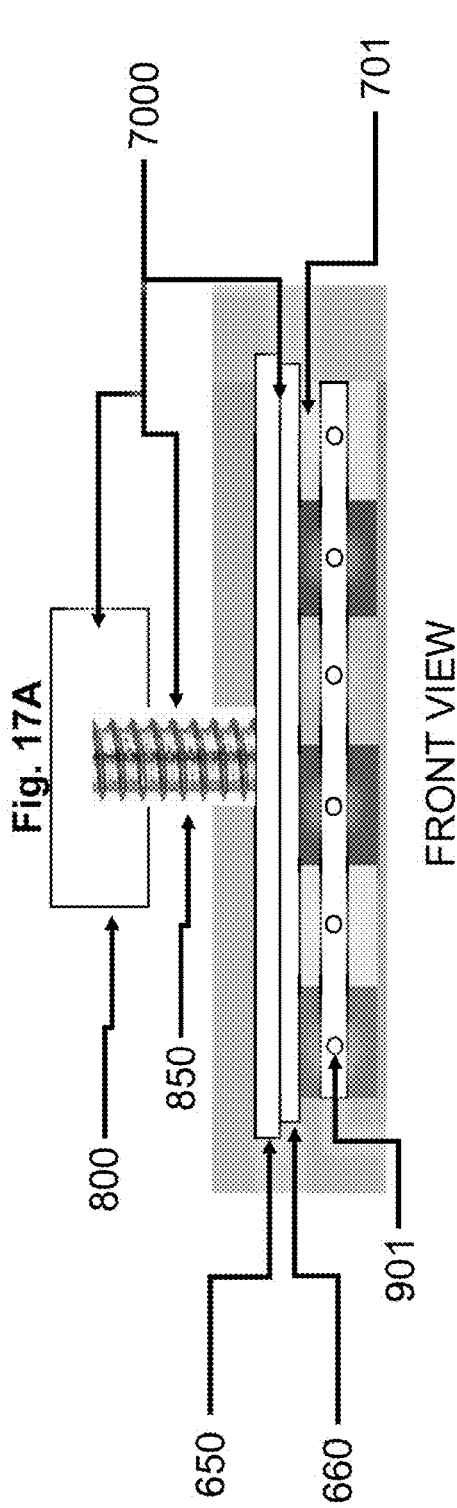
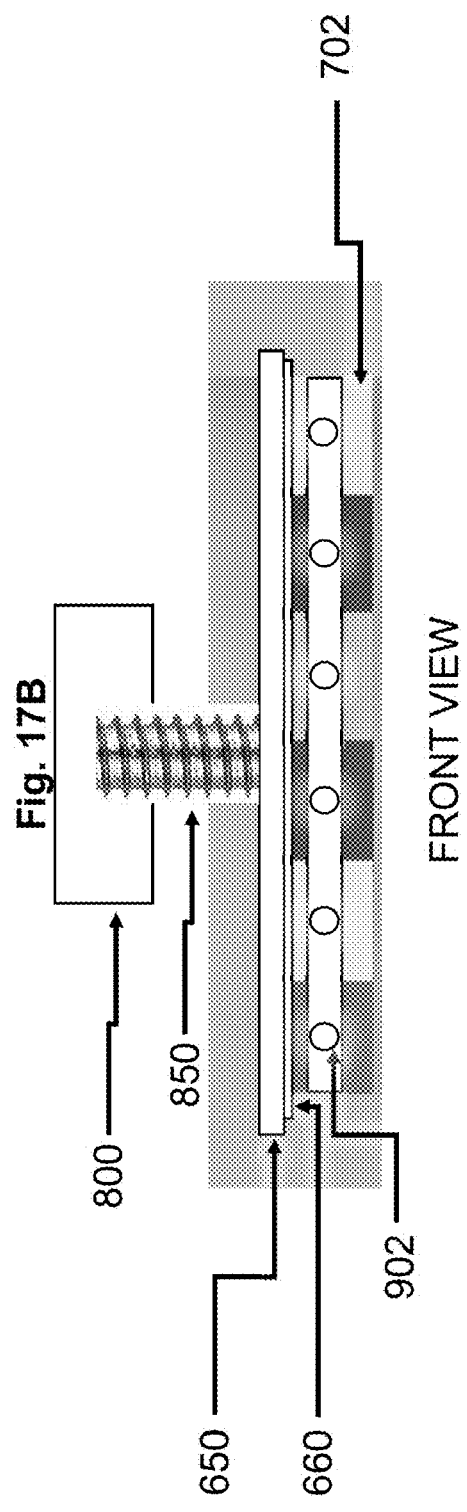

SPACE RAILWAY

CROSS-REFERENCE TO RELATED APPLICATIONS

The present application claims priority to U.S. Provisional Patent Application Ser. No. 63/399,846, filed Aug. 22, 2022 and U.S. Provisional Patent Application No. 63/299,897, filed Jan. 14, 2022, all of which are hereby incorporated by reference in their entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Tethers have been proposed as a mode of escaping Earth's gravitational force to access from low Earth to High Earth Orbit (HEO). Space tethers are classified as either propulsive, de-orbit, spinning, or lifting. Lifting tethers are the class related to this application. The most similar type is a space elevator consisting of a single tether linked to a space-based mass traveling in a geostationary orbit (GEO).

The relatively recent discovery of graphene has created an ultra-strong, ultra-lightweight fiber that in its tubular form could serve as a tether and has appeared in several concepts in the last few years for space elevators. In the 1990s, NASA commissioned several studies on the space elevator concept, and it was determined to be feasible to build. It would provide a cheaper way to transport payloads into space and launch spacecraft to distant planets. Previously proposed lengths for the space elevator's cable range from 100,000 to 144,000 kilometers (km), which is geostationary HEO.

The previously proposed space elevator construction utilizes a single cable rising from a point on Earth's equator to a height above GEO, where it terminates in a counterweight. The purpose of the counterweight is to avoid having the tower extend to a much greater height. However, the diameter of the previously proposed space elevator requires a massive counterweight, up to one-third the size of the Moon.

A different design that avoids the excessive stresses of a cable with a uniform diameter is a tapered design. In the tapered cable, the cross-section varies with its height so that the tension (or force per unit area) in the cable remains uniform along the entire length and at a value that available construction materials can safely support. Previously proposed materials include steel, Kevlar, and carbon nanotubes (CNTs). Steel and Kevlar yield exceptionally large taper ratios. They are, therefore, unsuitable as construction materials for a space elevator, but CNTs yield a modest taper ratio and are, therefore, an excellent material for this purpose. All current designs for a space elevator assume a tapered tower (or cable, as the tower is often termed), and believe that the tower is constructed of CNTs.

The magnetic levitation train, or MAGLEV train, is a vehicle for land transportation that floats above its horizontal track and is supported by either electromagnetic attraction or repulsion. MAGLEVs were conceptualized in the early 1900s by American professor and inventor Robert Goddard and French-born American engineer Emile Bachelet. Since 1984, several horizontal MAGLEV trains have been operating with extensive networks proposed for the future. Utilizing basic magnetic principles, MAGLEV trains are lifted, propelled, and guided over a track (or guideway). The materials used for these purposes include superconducting materials, electromagnets, diamagnets, and rare-earth magnets.

Two types of MAGLEVs are employed at present. Electromagnetic suspension (EMS) MAGLEVs have magnets on the train's sides, the underside, and the guideway to levitate the train. Electrodynamic suspension (EDS) MAGLEV systems utilize supercooled and superconducting magnets that repel the train from the guideway rather than attract them.

In 2001, NASA published articles on their Magnetic Launch Assist proposals. The 25-year maturity window that was promulgated regarding this proposal is rapidly closing without any evidence of an operational model. Tokyo-based Obayashi Corporation has an elaborate animation for a space elevator but believes it will take 30 years to complete its vision. Construction on the space elevator project has yet to commenced.

The two-sided linear induction motor, especially for suspended vehicles, was patented by Peter Schwarzler, U.S. Pat. No. 3,820,472A (expired), in 1973.

Heinkel He 178 the world's first aircraft to fly purely on turbojet power on Aug. 27, 1939, developed from the work of Hans von Ohain in Germany began in 1935.

Vertical/short takeoff and landing capabilities were first developed by the British manufacturer Hawker Siddeley Harrier in 1969 in the Harrier Jump Jet.

The earliest attempt at a powered Unmanned Aerial Vehicle was A. M. Low's "Aerial Target" in 1916. Low confirmed that Geoffrey de Havilland's monoplane flew under control on Mar. 21, 1917, using his radio system.

An autonomous robot is a robot that performs behaviors or tasks with a high degree of autonomy. Autonomous robotics is usually considered a subfield of artificial intelligence, robotics, and information engineering. Early versions were proposed and demonstrated by author/inventor David L. Heiserman. Autonomous robots are particularly desirable in fields such as spaceflight and delivering goods.

BRIEF SUMMARY OF THE INVENTION

There are five key differentiators of the invention's technology that, when integrated into the Space Railway™ system, can provide daily, high volume, high mass access to space. These five differentiators begin with a flexibly configurable tether. The flexibility is in using various tapering profiles not previously explored to meet the overall tether mission (Heavy lift tether, fast access to space tether, and extra-long tether for interplanetary launch capability). The second differentiator is embedded electromagnetic levitation and impulsion into the vertical advanced material tether. This is the primary moving force of the vertically traversing railcars. The third set of differentiators are the Space Railway™ vehicles that travels up and down the tether. The strength of the selected advanced material CNT or equivalent requires little cross-sectional area change from Earth to the tether's outer reach. This allows for a railcar design that has the tether pass through the middle of the railcar versus the railcar grappling onto the side of the tether. This provides additional magnetic impulsion and levitation versus a one-sided design and assists in limiting the asymmetric loads of the railcar on the tether. The fourth differentiator is the design and manufacture of the tether. The CNTs, or equivalent, are woven into cables with electromagnets embedded in the weaving. The fifth differentiator is kinetic energy harvesting technology to capture and store gravitational energy in descent from GEO to Earth or induced centrifugal energy from GEO to the outer reaches of the tether. These top five were singled out as the most enabling technologies. However, other technologies employed throughout this patent as part of the integrated system also have unique contributions to the overall Space Railway™.

Various vehicle concepts are envisioned to provide customer flexibility in payload capability and minimize the energy required to obtain the desired altitude from Low Earth Orbit (LEO) to the end of tether beyond GEO. The invention is superior to space elevator concepts which propose a mechanically propelled cab that travels only on the length of its tether, which is of a bulky design, components are subject to wear, and failure over the distance required to obtain GEO requires a counterweight one-third the size of the Moon at GEO and would take an estimated fifteen to thirty years to complete if construction began today. The invention provides a viable method of constructing an ultra-lightweight, electromagnetic railway that will significantly enhance the capacity to deliver people and payloads into outer space and allow for a controlled lower-speed descent from space to bring large payloads to Earth without the limitations of high-speed reentry vehicle approach currently utilized.

BRIEF DESCRIPTION OF THE SEVERAL VIEWS OF THE DRAWING

FIG. 9 illustrates a cutaway view of a HTV with jets, Maneuvering Rockets, Failsafe Braking Parachutes, and Double-sided Linear Induction Motors sandwiching the multi-railed advanced materials with Null Flux Coils (e.g., CNTs or material(s) with similar properties) tether.

FIG. 11a illustrates the DLIM with a tether rail and embedded Null Flux Coils between the two linear induction motors. Tether rails and Null Flux Coils are made with advanced materials (e.g., CNTs or material(s) with similar properties) (side view). FIG. 11b illustrates the Halbach array of the DLIM sandwiching the multi-rails of the tether (isometric view).

FIG. 14a illustrates the front view and FIG. 14b illustrates the side view of the Moto-Bot atop the primary rail line made with the advanced materials (e.g., CNTs or material(s) with similar properties) towing a secondary rail line composed of advanced materials (e.g., CNTs or material(s) with similar properties).

FIG. 16b is a cross-sectional view of the hybrid Hoytether of FIG. 16a. FIG. 16c is a cross-sectional view of the hybrid Hoytether of FIG. 16a.

FIG. 17a illustrates a Telescopic Adjuster connected to one half of the DLIM at launch and FIG. 17b illustrates the compensatory widening of the space between the two plates of the DLIM as the tether tapers outward at GEO.

DETAILED DESCRIPTION OF THE INVENTION

The space transportation system of the present invention, hereafter referred to as Space Railway™, includes a Mission Control and Earth-based port (130), a Counterweight (103), and a tapered tether (100) consisting of multiple rails of tapered advanced materials (e.g., CNTs or material(s) with similar properties) (102, 105, 113, and 2000), and a transport vehicle (101, illustrates a standard 3-car vehicle).

Figure 7:
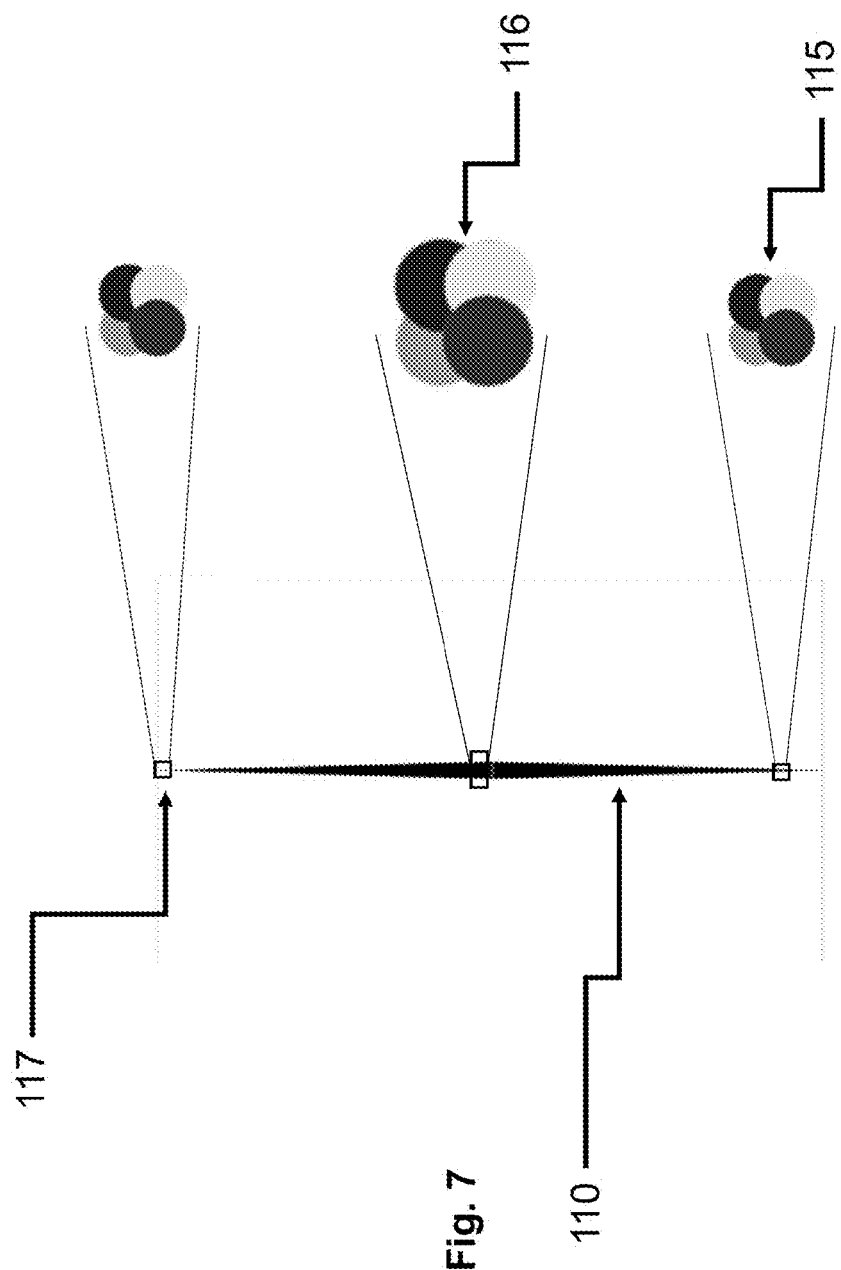
FIG. 7 illustrates a not to scale view of the changes in rail diameter from ground station to end of tether. Peak stress in the tether will be at the geostationary orbit altitude, at which point the final configuration will be the thickest and most robust. The ground level will be the area of lowest stress except under certain limited operations. To save weight and cost the tether will have a taper depending on the maximum load of the points along the tether with a factor of safety.
Figure 8:
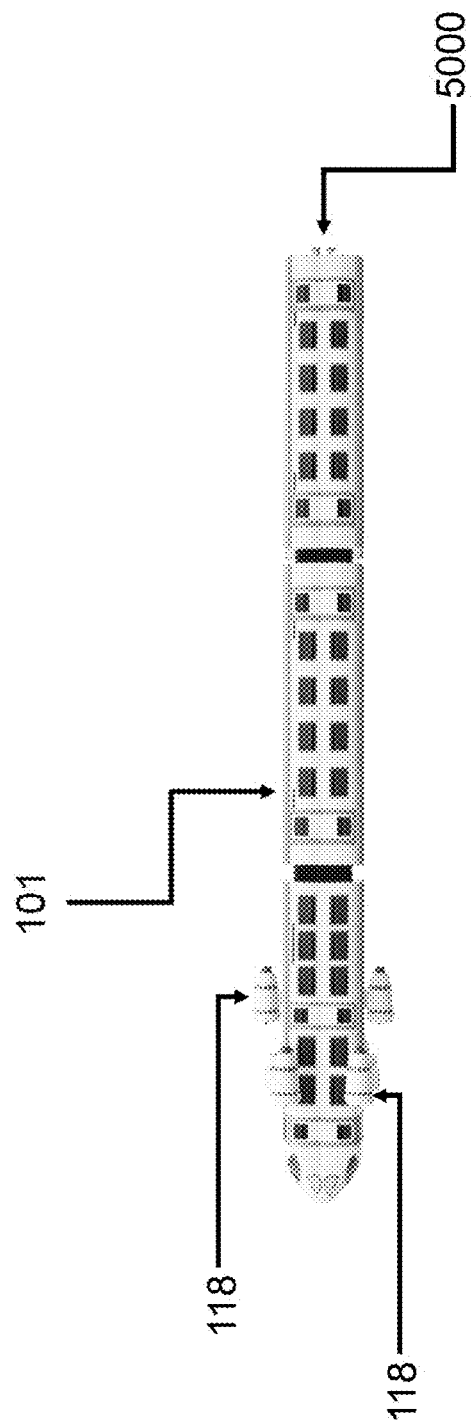
FIG. 8 illustrates a standard three-car hybrid HTV with its jet engines and optional Maneuvering Rockets for vehicles intending to depart from the tether (side view).

The concept of a MAGLEV space train is a unique improvement of the space elevator concept; all current designs for a space tower employ CNTs constructed in a tapered fashion to support a gripping mechanism-based vehicle for travel up and down the tether. The Maglev concept provides for a levitated powered vehicle, reducing forces applied on the tether. A uniform thickness approach to the tether is one approach to for a CNT solution. There are multiple other tapered thicknesses are a function of altitude that can be used to optimize a tether for various uses. One tapering approach is to taper the advanced materials (e.g., CNTs or material(s) with similar properties) (FIG. 7) to increase the thickness from earth's surface up to GEO. Then it decreases in thickness afterward to the end of the tether. The tapering minimizes the weight of the tether assembly and reduces cost by sizing the tether's strength capacity based on loads of the tether and loads of various railcars under maximum loading conditions. The tether will also include a factor of safety. This avoids excessive weight and cost found in previous space elevator concepts with a uniform diameter. Each of the six Space Railways tethers discussed in this patent could be optimized for specific missions.

The uniqueness of the tether used in this invention includes its system level use as a form of magnetic ascension of spacecraft for the purpose of the variety of missions previously outlined. The uniqueness of the tether in this invention also includes component level features which include flexibility in material composition and design, use as an electrical distribution and storage line, and its use as in electrodynamic power producer. All these features serve the unique purpose of directly or indirectly producing electromagnetic lift, or MAGLIFT, of spacecraft, and directly or indirectly aiding in the deceleration of vehicles used for space travel.

Initial deployment of the tether begins in space with the systems (FIG. 3) initially launched into space by a commercial rocket (1000) and is designed to be as lightweight as possible and represents a skeletal structure upon which additional rails and its resulting enhanced load capacity are added from the ground up. Therefore, the two rocket launched spools are each composed of a tapered, quadruple braided (2000) advanced materials (e.g., CNTs or material (s) with similar properties) fiber.

The advantage of CNTs derives from the combination of high tensile strength, low density, and exceptional flexibility. CNTs come in many varieties. In terms of the feasibility of a geostationary space tether, zigzag single-walled carbon nanotubes (SWNTs) provide superior characteristics because they are least likely to deform. Deformation results in unpredictably consequences in the tensile strength of the tether. Even though zigzag SWNTs deform the least, they also are the most brittle as compared to other choices. However, this is still strong enough for an individual rail of a space railway, which should have a safety factor of 1.5-2.0.

Once deployed and anchored at the ground station and counterweight, the railway tethers are in tension with minimum load at the ground station when the system is static. The counterbalance beyond GEO is sized (depending on overall tether weight and counterbalance location) to provide adequate outward centrifugal forces to compensate for the gravitational forces of the tether below GEO and the rail car loads as it ascends or descends the tether. The stationary deployed railway tethers are in tension along their total length to maintain the integrity of the CNT-based tether. This point can be understood by considering the four forces acting on a small component of a single rail line under tension: an upward force $F_U$ due to the portion of the rail above the component, a downward force $F_D$ due to the portion of the rail below the component, a downward force due to its gravitational force $F_W$ (mass times gravity at that point of the component), and upward centrifugal force $F_C$ on the component due to its presence on the rotating Earth. The vector sum of these four forces must balance if the component is in equilibrium.

Space Railway™ is a tethered system at a stationary position on Earth. In another embodiment, a sea-based Space Railway™ can be repositioned in a slow, controlled manner, which will also move the whole tether. In either case, the tether needs to be in geostationary position no matter its altitude. A geostationary orbit of a free-floating object is the point above the Equator in which the gravitational force on an object is equal to the centrifugal forces on the object. If gravitational forces are higher than the centrifugal force, then the object would fall to earth. If centrifugal forces are great the object would leave Earth's orbit. For a tethered system, the centrifugal force minus the gravitation force beyond GEO must be equal to or greater than the gravitational forces minus centrifugal forces below GEO. If the beyond GEO forces are less than the inner GEO forces the tether would deorbit. The viability of this concept will be analytically proven for a simple case of a non-tapered tether with no rail cars, counterweights, or solar panels. The analysis will determine the height of a tether for it to support its weight with no load at the Earth's surface. The calculations in Equations (1) through (8) below will focus on a single advanced materials (e.g., CNTs or material(s) with similar properties) non-tapered fiber of the quadruple braided fibers without the Counterweight or NFCs, as a demonstration of the tether analysis to determine loads under various tether, railcar, counterweight configurations.

Let M, R, and ω represent the mass, radius, and rotational angular velocity of the Earth. The radius of GEO is $R_g = (GM/\omega^2)^{1/3}$, where G is Newton's constant of gravitation. To analyze the forces in a free-standing vertically static rail of constant mass density ρ and uniform cross-sectional area A, consider a small component of the rail of length dr whose lower end is a distance r from the Earth's center. The static equilibrium of this rail requires that the vector sum of the forces to balance with zero force at the surface of the Earth or that $F_U + F_C - F_D - W = 0$. Therefore, $F_U - F_D$ is written as AdT, where T is the tensile stress (force per unit area) in the rail. The explicit expressions for W and $F_C$ can rewritten as the following equilibrium condition (ρ=density of non-tapered braided fiber, A is a constant cross-sectional area, and r is the distance above the earth's surface):

$$F = (Adr\rho)\omega^2(R+r) \cdot - \frac{GM(Adr\rho)}{(R+r)^2} \qquad (1)$$

Integrating Eq. [1] for force below geostationary orbit $R_g$ with zero stress at r=0 gives stress of:

$$F_{geo-} = \frac{(A\rho R_g^3 + 3A\rho RR_g^2 + 2A\rho R^2 R_g)\omega^2 + 2A\rho GM}{2R_g + 2R} - \frac{A\rho GM}{R} \quad (2)$$

Let H signify the distance of the top of the rail from the Earth's surface. Integrating Eq. (1) from r=$R_g$ to r=H subject to the boundary condition T(H)=0 when no counterweight is at the end of the tether gives the force at GEO $R_g$ as $$F_{geo+} = \frac{(A\rho H^3 + 3A\rho RH^2 + 2A\rho R^2 H)\omega^2 + 2A\rho GM}{2R + 2H} - \frac{(A\rho R_g^3 + 3A\rho RR_g^2 + 2A\rho R^2 R_g)\omega^2 + 2A\rho GM}{2R_g + 2R} \quad (3)$$

For the special condition of zero force at the surface, no counterweight, uniform cross sectional area of the tether and on rail cars or other forces acting on the tether, $F_{geo-}$ will equal $F_{geo+}$. Adding Equations 2 and 3 and reducing the resulting equation yields.

$$\frac{(H^3 + 3RH^2 + 2R^2 H)\omega^2 + 2GM}{2R + 2H} - \frac{GM}{R} = 0 \quad (4)$$

Solving Eq [4] for H results in three roots, one trivial (h=0), one negative (meaningless for this analysis) and one positive. The resulting solution for a uniform tether anchored at the earth's surface with zero stress at the surface is $$H = \frac{\sqrt{(R^4\omega^2 + 8GMR)} + 3R^2\omega}{2R\omega} \quad (5)$$

Substituting in the variables for a geostationary tether
H=143,801 km

The height of the top of the advanced materials (e.g., CNTs or material(s) with similar properties) fibers above the Earth's surface is consequently approximately 144,000 km.

A tapered profile advanced tapered materials (e.g., CNTs or material(s) with similar properties) fiber (110) with a cross-section that varies with height in such a way that reduces weight and cost of excess fiber material not required to support the forces exerted on the rail. Tensile forces are lowest near the earth's surface, where the gravitation force is most significant, and the centrifugal force is lowest. Reducing the mass of the rail close to the earth will benefit the whole system. Different tapering profiles can account for different railway forces and railcar configurations to meet design optimizations. The following is an example of a simple stepwise tapering from the Earth's surface to GEO and then maintaining the maximum cross-sectional area at geo to the remainder of the height of the tether. This tapering approach which leaves excessive mass beyond GEO will reduce the overall length of the tether. This requirement implies that the initial tapered fiber (115) must have a cross-section that increases with height up to the GEO (116) and then remains at the end of the tether afterward (117).

An assessment of the forces on the rail form earth's surface to Geo led to selecting a five-step area change taper. This is not envisioned to be an optimized taper but is a demonstration of tapering being used to optimize the space railway concept. Defining $A_{geo}$, as the maximum area of the tether due to maximum stress the tapering was selected to be as follows in Table I below:

TABLE I

| Segment in meters about Earth | Percent of $A_{geo}$ |
|---|---|
| $0 - 2.5 \times 10^6$ | 27% |
| $2.5 \times 10^6 - 5.0 \times 10^6$ | 53% |
| $5.0 \times 10^6 - 7.5 \times 10^6$ | 75% |
| $7.5 \times 10^6 - 1.75 \times 10^7$ | 95% |
| $1.75 \times 10^7 - R_{geo}$ | 100% |
| $R_{geo} - H$ | 100% |

This stepwise tapering approach does not have an elegant analytical solution as one that can be mathematically defined in continuous equation for A(R+r). Equation [1] is integrated in five parts over the segments selected to define the below GEO load on the tether at GEO.

$$F_{geo-} = \int_0^{2.5\times 10^6} 0.27\left((Ad r\rho)\omega^2(R+r) - \frac{GM(Ad r\rho)}{(R+r)^2}\right) +$$
$$\int_{2.5\times 10^6}^{5\times 10^6} 0.53\left((Ad r\rho)\omega^2(R+r) - \frac{GM(Ad r\rho)}{(R+r)^2}\right) +$$
$$\int_{5\times 10^6}^{7.5\times 10^6} 0.75\left((Ad r\rho)\omega^2(R+r) - \frac{GM(Ad r\rho)}{(R+r)^2}\right) +$$
$$\int_{7.5\times 10^6}^{1.75\times 10^7} 0.95\left((Ad r\rho)\omega^2(R+r) - \frac{GM(Ad r\rho)}{(R+r)^2}\right) +$$
$$\int_{1.75\times 10^6}^{R_g} 1.00\left((Ad r\rho)\omega^2(R+r) - \frac{GM(Ad r\rho)}{(R+r)^2}\right)$$

In this tapering case $F_{geo+}$, Eq [3], remains the same. For the balanced case with zero stress at the Earth's surface to minimize tensile forces $F_{geo-}=F_{geo+}$.

$$F_{geo-} = \int_0^{2.5\times 10^6} 0.27\left((Ad r\rho)\omega^2(R+r) - \frac{GM(Ad r\rho)}{(R+r)^2}\right) +$$
$$\int_{2.5\times 10^6}^{5\times 10^6} 0.53\left((Ad r\rho)\omega^2(R+r) - \frac{GM(Ad r\rho)}{(R+r)^2}\right) +$$
$$\int_{5\times 10^6}^{7.5\times 10^6} 0.75\left((Ad r\rho)\omega^2(R+r) - \frac{GM(Ad r\rho)}{(R+r)^2}\right) +$$
$$\int_{7.5\times 10^6}^{1.75\times 10^7} 0.95\left((Ad r\rho)\omega^2(R+r) - \frac{GM(Ad r\rho)}{(R+r)^2}\right) +$$
$$\int_{1.75\times 10^6}^{R_g} 1.00\left((Ad r\rho)\omega^2(R+r) - \frac{GM(Ad r\rho)}{(R+r)^2}\right) =$$
$$\frac{(A\rho H^3 + 3A\rho RH^2 + 2A\rho R^2 H)\omega^2 + 2A\rho GM}{2R + 2H} +$$
$$\frac{(A\rho R_g^3 + 3A\rho RR_g^2 + 2A\rho R^2 R_g)\omega^2 + 2A\rho GM}{2R_g + 2R}$$

Factoring out ρA $$\int_0^{2.5\times 10^6} 0.27\left(\omega^2(R+r) - \frac{GM}{(R+r)^2}\right) dr +$$

-continued $$\int_{2.5\times10^6}^{5\times10^6} 0.53\left(\omega^2(R+r)\cdot - \frac{GM(Adr\rho)}{(R\mp r)^2}\right)dr +$$

$$\int_{5\times10^6}^{7.5\times10^6} 0.75\left(\omega^2(R+r)\cdot - \frac{GM}{(R+r)^2}\right)dr +$$

$$\int_{7.5\times10^6}^{1.75\times10^7} 0.95\left(\omega^2(R+r)\cdot - \frac{GM}{(R+r)^2}\right)dr +$$

$$\int_{1.75\times10^6}^{R_g} 1.00\left(\omega^2(R+r)\cdot - \frac{GM}{(R+r)^2}\right)dr =$$

$$\frac{(H^3 + 3RH^2 + 2R^2H)\omega^2 + 2GM}{2R+2H} - \frac{(R_g^3 + 3RR_g^2 + 2R^2R_g)\omega^2 + 2GM}{2R_g+2R}$$

Including the variables and integrating the equation then solving for a meaningful value of H yield 116,299 km which is 19% less than the constant area free standing tether of 144,000 km. There are many other trade studies that can be conducted to optimize various aspects of the overall space railway system. Capability of multiple rail trains at various altitudes at the same time, desire for longer tethers to assist in interplanetary space launch, space platforms as counterweights (hotels, research facilities, zero-g or near zero-g manufacturing, energy collection and distribution all need to be balanced against cost.

The main difference between the constant cross-section and tapered fibers is that the large stress and constant cross-section of the former are substituted for the smaller stress and variable cross-section of the latter. This tradeoff turns out to be crucial for the flexibility of Space Railway™ allowing for reduce stress or increased capacity of the load carrying capability of the rail.

Material selection is crucial for Space Railway™ to become a reality. Strength to weight and other mechanical properties must be obtainable and affordable. As an example of viable materials, the constant area model first presented is used as a first filter. Equation [1] is integrated from zero to an arbitrary point $h_p$. Setting $h_p=R_g$, since $R_g$ is the location of highest forces results in Equation [2]. Rearranging Equation [2]

$$F_{max} = A\rho\left(\frac{(R_g^3 + 3RR_g^2 + 2R^2R_g)\omega^2 + 2GM}{2R_g+2R} - \frac{GM}{R}\right)$$

Substituting in the various factors results in $$F_{max}=A\rho 4.85642\times10^7$$

Or required minimum tensile strength, without a factor of safety, is $$T_{min} = \frac{F_{max}}{A} = \rho 4.85642 \times 10^7$$

Using the data for three targeted materials the minimum tensile strength for a material to be considered a solution for a constant area tether are: Steel 385,965 GPa, Kevlar 69.932 GPa, or CNTs 63.133 GPa. Of the three materials on CNTs have the tensile strength to meet the requirements of a space railway. Another measure of merit for previous space elevator effort is in terms of characteristic length, $L_c=T/\rho g=F_{Max}/A\rho g$ with A being the cross-sectional area $\rho$ being density, and g being the gravitational constant at the surface of the earth=9.81 m/sec². Minimum Le for an acceptable material is:

$$L_C = \frac{F_{max}}{A\rho g} = 4.85642\times10^7/9.81 = 4,950 \text{ km}$$

A review of Table 1 highlights the only acceptable material is a CNT material or something similar in material properties. CNTs also have an adequate margin of safety of 2.06 on Tensile strength and 2.06 on characteristic length.

Table II uses Eq. (8) to calculate the characteristic lengths and taper ratios of rail lines made from steel, Kevlar, and CNTs.

TABLE II

| Material | Density ρ (kg/m³) | Max tensile stress T (GPa) | $L_c$ = T/ρg (km) | Taper ratio |
|---|---|---|---|---|
| Steel | 7900 | 5.0 | 65 | $1.6 \times 10^{33}$ |
| Kevlar | 1440 | 3.6 | 255 | $2.5 \times 10^8$ |
| CNTs | 1300 | 130 | 10,200 | 1.6 |

This illustrates that steel and Kevlar produce exceptionally large taper ratios and are, therefore, unsuitable as construction materials for Space Railway™. However, CNTs yield a low taper ratio and are an ideal material for this purpose. The advantage of CNTs stems from their combination of high tensile strength and low density producing a characteristic length considerably larger than that of other materials. Because the characteristic length appears in the exponent in Eq. (8), even a fairly small increase in it gives rise to a spectacular decrease of the taper ratio.

To create a longitudinally strong advanced materials (e.g., CNTs or material(s) with similar properties) fiber, a quadruple braided fiber will be employed (2000). Current techniques for manufacturing CNT cannot create a single strand of CNT in great lengths. However, it is possible to create a durable rail line by tightly braiding thread-like fibers. The manufacturing technique would employ creating yarn fibers similar to the process of producing Miralon™ yarn created by Nanocomp Technologies, Inc.

In another embodiment, a hybrid Hoytether design (6000) is utilized for the individual rail tethers. Previously proposed by Robert Hoyt, it consists of a lattice of vertical advanced materials (e.g., CNTs or material(s) with similar properties) and diagonal advanced materials (e.g., CNTs or material(s) with similar properties) forming a diamond pattern. The hybrid model of the Hoytether retains the ribs, curvature, and advanced materials with properties like carbon nanotubes/epoxy composite of the standard design but replaces the vertical nanotubes with the Hoytether weave. However, the Hoytether diamonds are widened to make this hybrid considerably lighter than the traditional Hoytether design. While the Hoytether allows for resistance to debris, the tensile strength of the Standard Model is maintained in this Hybrid through the thick vertical ribs. This model was increased in scale considerably, with each nanotube having a radius of 0.5 mm. The entire height of this section was 20 mm, and its width was 46.7 mm from end to end. The hybrid Hoytether design may preclude the necessity for using NFCs.

It turns out that the total length of Space Railway™ can be considerably shorten by terminating it at its upper terminus by a counterweight of an appropriate mass. The action of the counterweight can be understood as follows: a counterweight geostationary orbit produces a centrifugal force larger than the Earth's gravitational force and is sustained in its orbit by tension of the tether preventing the counterweight from departing earth's orbit into outer space. The tether has ample factor of safety, see above, to accommodate an extra inward force applied on it by the counterweight when advanced materials (e.g., CNTs or material(s) with similar properties) are utilized for the rail lines. The counterweight as illustrated (103) represent a series of distributed solar panels along the rail lines for great lengths. The solar panels beyond geostationary orbit will act as a counterweight. The counterweight could also be more of a larger mass (space hotel, research facility, manufacturing facility, or interplanetary departing facility) acting as a point load.

Additional flexibility in Space Railway™ operations can be had through counterweights beyond geostationary orbit. Two approaches are to use a distributed mass over the length or partial length of the tether beyond geostationary orbit, or a large mass acting as a point load somewhere above geostationary orbit. One purpose could be to shorten the overall tether length. Using the uniform cross-sectional area of a tether as an example, the forces beyond geostationary orbit for the distributed and point load would be:

$$F_{geo+} = \int_{R_g}^{H}\left((Adr\rho)\omega^2(R+r) - \frac{GM(Adr\rho)}{(R+r)^2}\right) +$$

$$\int_{R_g}^{H}\left((A_{cw}dr\rho_{cw})\omega^2(R+r) - \frac{GM(A_{cw}dr\rho_{cw})}{(R+r)^2}\right)$$

and $$F_{geo+} =$$

$$\int_{R_g}^{H}\left((Adr\rho)\omega^2(R+r) \cdot - \frac{GM(Adr\rho)}{(R+r)^2}\right) + (m_{cw})\omega^2(R+r_{cw}) \cdot - \frac{GM(m_{cw})}{(R+r_{cw})^2}$$

Respectively. The forces below geostationary orbit is still given by Equation [2]. Balancing the forces $F_{geo+} + F_{geo-} = 0$, $$\int_{R_g}^{H}\left((Adr\rho)\omega^2(R+r) - \frac{GM(Adr\rho)}{(R+r)^2}\right) +$$

$$\int_{R_g}^{H}\left((A_{cw}dr\rho_{cw})\omega^2(R+r) - \frac{GM(A_{cw}dr\rho_{cw})}{(R+r)^2}\right) +$$

$$\left(\frac{(A\rho R_g^3 + 3A\rho RR_g^2 + 2A\rho R^2 R_g)\omega^2 + 2A\rho GM}{2R_g + 2R} - \frac{A\rho GM}{R}\right) = 0$$

Defining $m_r = A_{cw}\rho_{cw}/(A\rho)$ as the ratio of mass of the distributed counterweight and the tether mass per linear meter. The equation is reduced to $$\int_{R_g}^{H}\left(\omega^2(R+r) - \frac{GM}{(R+r)^2}\right)dr + \int_{R_g}^{H}\left(m_r\omega^2(R+r) - \frac{GMm_r}{(R+r)^2}\right)dr +$$

$$\left(\frac{(R_g^3 + 3RR_g^2 + 2R^2 R_g)\omega^2 + 2GM}{2R_g + 2R} - \frac{GM}{R}\right) = 0$$

Calculating the height of the tether as a function of different mass ratios $m_r$ yields the values in Table III below.

TABLE III

| Mass Ratio of Continuous Counterweight to Mass of Tether per linear meter | Height of Tether (km) | % Reduction in length |
|---|---|---|
| 0 | 143,801 | 0 |
| 0.2 | 133,215 | 7.36 |
| 0.4 | 124,937 | 13.12 |
| 0.6 | 118,330 | 17.71 |
| 0.8 | 112,906 | 21.48 |
| 1.0 | 108,356 | 24.65 |
| 2.0 | 93,226 | 35.17 |
| 3.0 | 84,469 | 41.26 |

A point load beyond geostationary orbit force balance equation is $$\int_{R_g}^{H}\left((Adr\rho)\omega^2(R+r) \cdot - \frac{GM(Adr\rho)}{(R+r)^2}\right) + (m_{pcw})\omega^2(R+r_{cw}) - \frac{GM(m_{pcw})}{(R+r_{cw})^2} +$$

$$\left(\frac{(A\rho R_g^3 + 3A\rho RR_g^2 + 2A\rho R^2 R_g)\omega^2 + 2A\rho GM}{2R_g + 2R} - \frac{A\rho GM}{R}\right) = 0$$

Defining $m_{pr} = m_{cw}/(A\rho)$ as the ratio of total mass of the point $m_{pcw}$ and the mass of the tether per linear meter. The equation is reduced to $$\int_{R_g}^{H}\left(\omega^2(R+r) \cdot - \frac{GM}{(R+r)^2}\right)dr + (m_{pr})\omega^2(R+r_{cw}) -$$

$$\frac{GM(m_{pr})}{(R+r_{cw})^2} + \left(\frac{(R_g^3 + 3RR_g^2 + 2R^2 R_g)\omega^2 + 2GM}{2R_g + 2R} - \frac{GM}{R}\right) = 0$$

Calculating the height of the tether as a function of different mass ratios $m_{pr}$ assuming the point counterweight is at maximum height H yields the values in Table IV below.

TABLE IV

| Mass Ratio of Point Counterweight to Mass of Tether per linear meter | Height of Tether (km) | % Reduction in length |
|---|---|---|
| 0 | 143,801 | 0 |
| 5000000 | 139,069 | 3.29 |
| 10000000 | 134,337 | 6.58 |
| 20000000 | 125,410 | 12.79 |
| 40000000 | 109693 | 23.72 |
| 60000000 | 96,709 | 32.75 |
| 80000000 | 86,208 | 40.05 |
| 100000000 | 77,850 | 45.86 |

Figure 3:
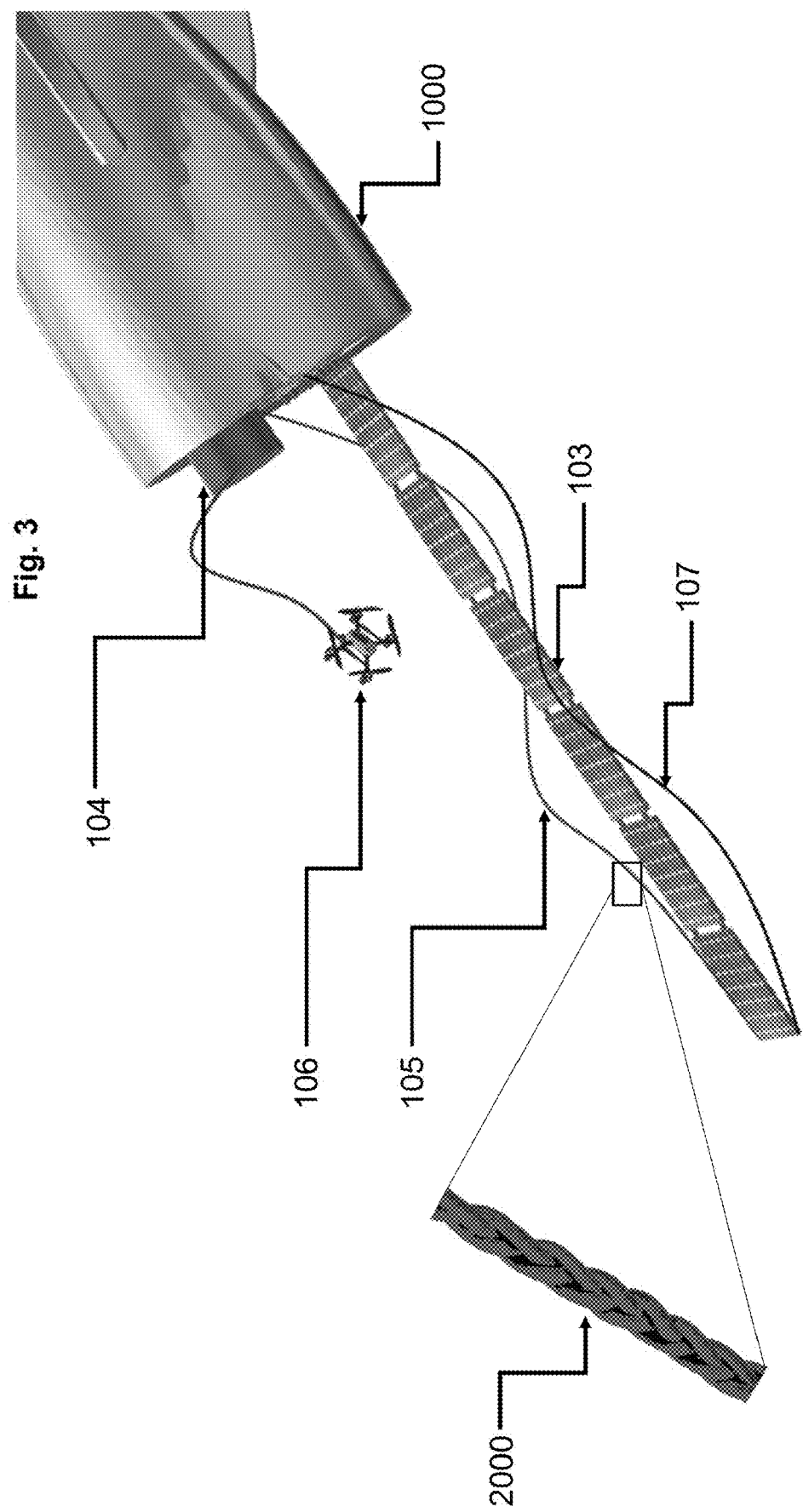
FIG. 3 illustrates the initial deployment of the multi-paneled counterweight and the initiation of the unspooling of the primary rail line composed of advanced materials (e.g., CNTs or composite material) from a rocket in GEO by a De-spooling Drone. As the De-Spooling Drone descends toward Earth with the primary line, a construction equipment module will ascend in altitude to balance the overall tether assembly in GEO.
Figure 4:
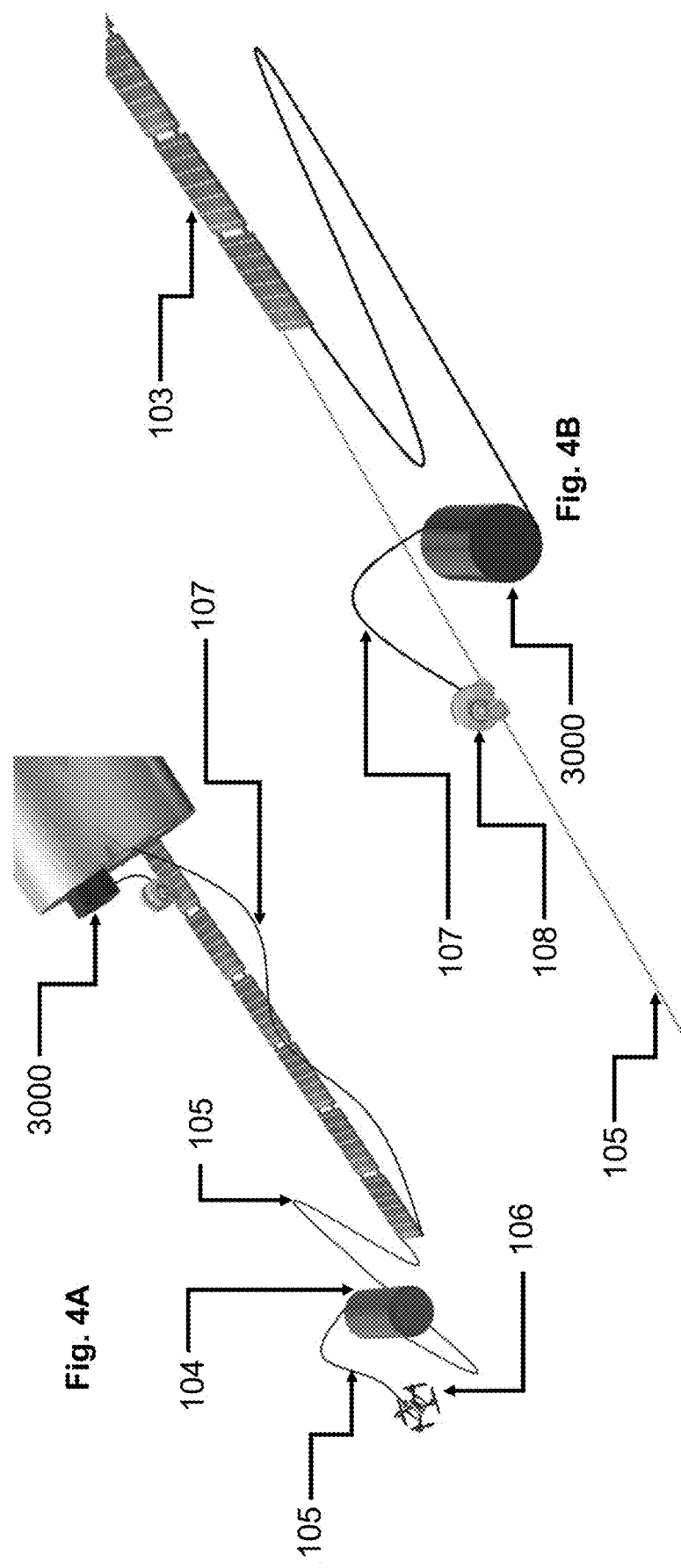
FIG. 4a illustrates the continued deployment of the advanced materials (e.g., CNTs or composite material) primary rail line toward Earth
FIG. 4b illustrates the initiation of the deployment of the secondary rail line made from advanced materials (e.g., CNTs or material(s) with similar properties) from a rocket in GEO by a Moto-Bot. A Moto-Bot descends along the primary rail line unfurling a secondary spool of advanced material to deploy the secondary tether rail line. Both primary and secondary lines are anchored at an Earth-based ground station.

To bring the primary (104) and secondary (3000) rocket launched advanced materials (e.g., CNTs or material(s) with similar properties) fibers back to Earth, the Company will utilize two mechanical devices (FIG. 3-4*b*). The first, dubbed De-spooling Drone (106), is designed to ferry the first advanced materials line (105) from HEO to ELS. The second robotic drone, named Moto-Bot (108), will travel down the first line to deliver the second line (107) to the ELS.

A Geostationary Orbiting Track Deployment Platform will de-spool the advanced materials lines in both directions from the platform using the De-spooling Drone and Moto-Bot. The advanced materials lines will eventually reach the ELS on Earth and the Counterweight or apex positioned approximately 100,000 km in GEO orbit.

In one embodiment, the railway tethers are thickened over time by repeating the de-spooling of braided advanced materials (e.g., CNT or material(s) with similar properties) to the ELS and Counterweight.

Construction of a modular solar array powered station around the platform will generate tether/track power and serve as a launch station for deep space versions of the HTVs for interplanetary travel.

The initial GEO Platform will evolve from the initial unspooling platform in GEO orbit designed to deploy the tethered track to a multi-purpose space station (i.e., the GEO Station) serving HTV travel, payload, and passenger deployment as well as science, military, and tourist needs.

The railway tether serves as an electrodynamic tether (EDT) capable of generating power for the system, wherein the EDT incorporates an insulated advanced conductive material (e.g., graphene-based) to carry the electrical current. Integrating the highly electro-conductive advanced material (e.g., graphene-based) into each power generation source will substantially increase the conductive energy to supplement power to both railway and station(s).

In another embodiment, the primary and secondary rail fibers are unspooled to Earth using a mechanical gear system that lowers each fiber and each fiber has a nonflammable weight attached to their unspooled ends; a homing device is embedded in the weight for tracking purposes.

Figure 5:
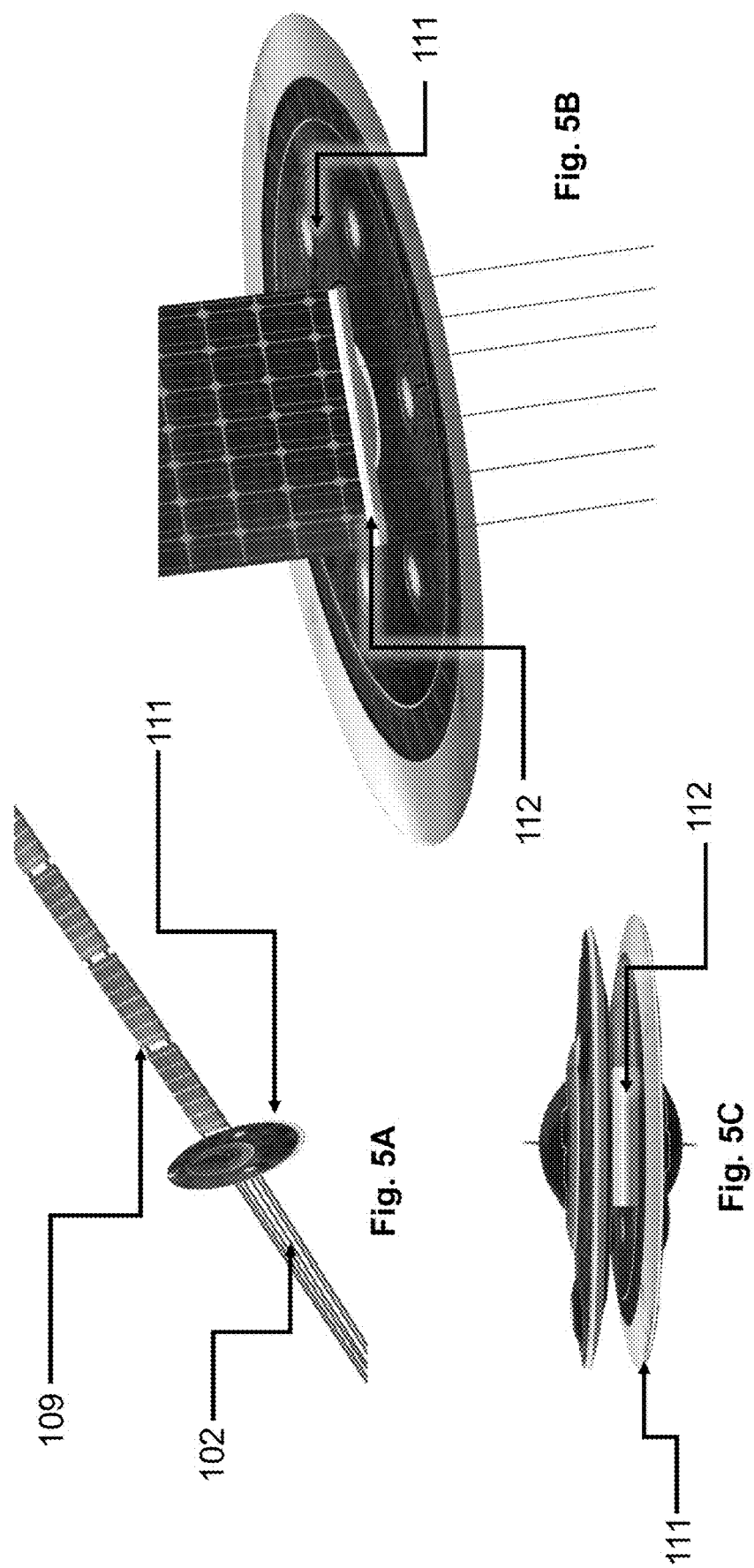
FIG. 5a illustrates a Stringer, which ascends the primary and secondary rails from Earth once they are anchored at the ground station, lifting additional rail lines between the primary and secondary rail lines made with advanced materials (e.g., CNTs or material(s) with similar properties) to create a multi-railed tether.
FIG. 5b illustrates a cutaway view of a Stringer docking an electrical conduit to the Counterweight, thereby anchoring additional rail lines to the Counterweight.
FIG. 5c illustrates a side view of the double-decker Stringer with the anchor/conduit.
Figure 6:
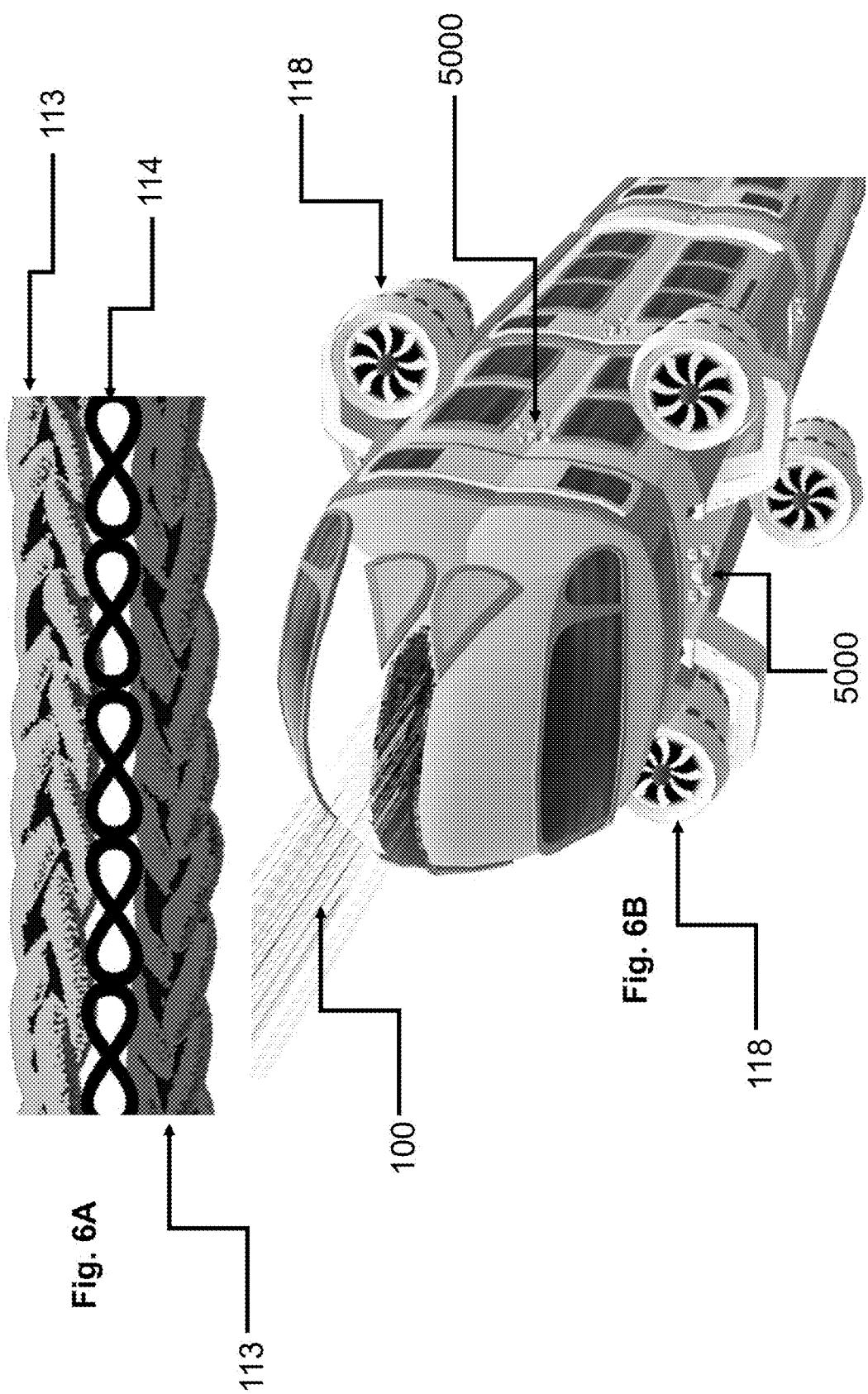
FIG. 6a illustrates the advanced materials (e.g., CNTs or material(s) with similar properties) in a quadruple braided configuration with figure-8 Null Flux Coils (NFC) (top view)
FIG. 6b illustrates the HTV ascending the multi-railed tether (isometric view).
Figure 10A:
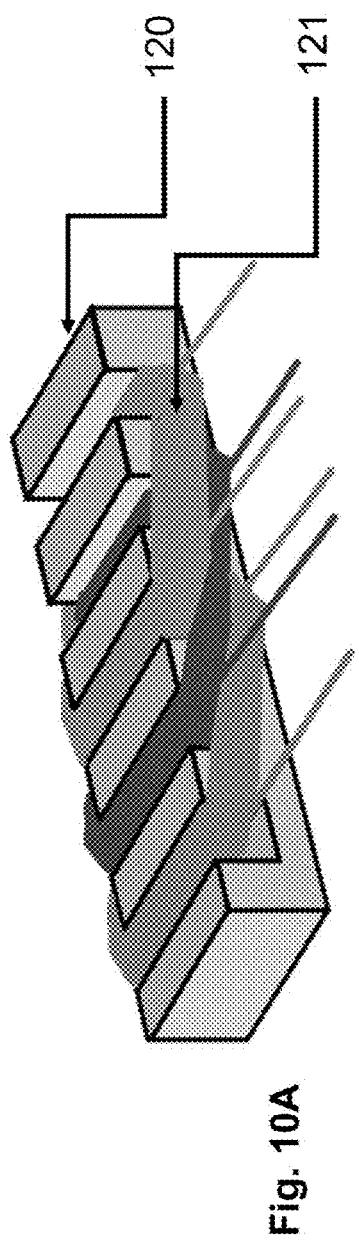
FIG. 10a illustrates a three-phase linear induction motor with its grooved primary core and the windings laid into them on top of each other.
Figure 10B:
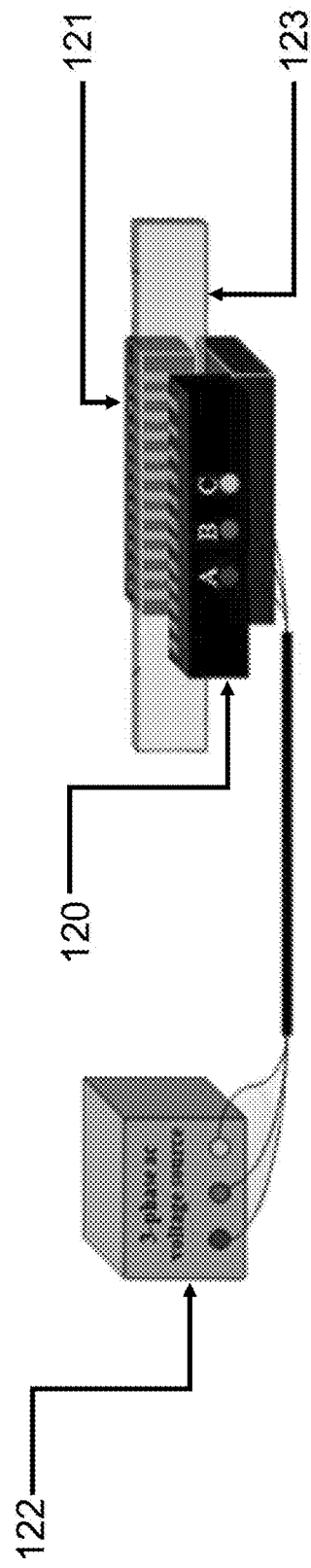
FIG. 10b illustrates the components of the double-sided linear induction motor (DLIM) (isometric views) straddling a tether rail with embedded Null Flux Coils.
Figure 12:
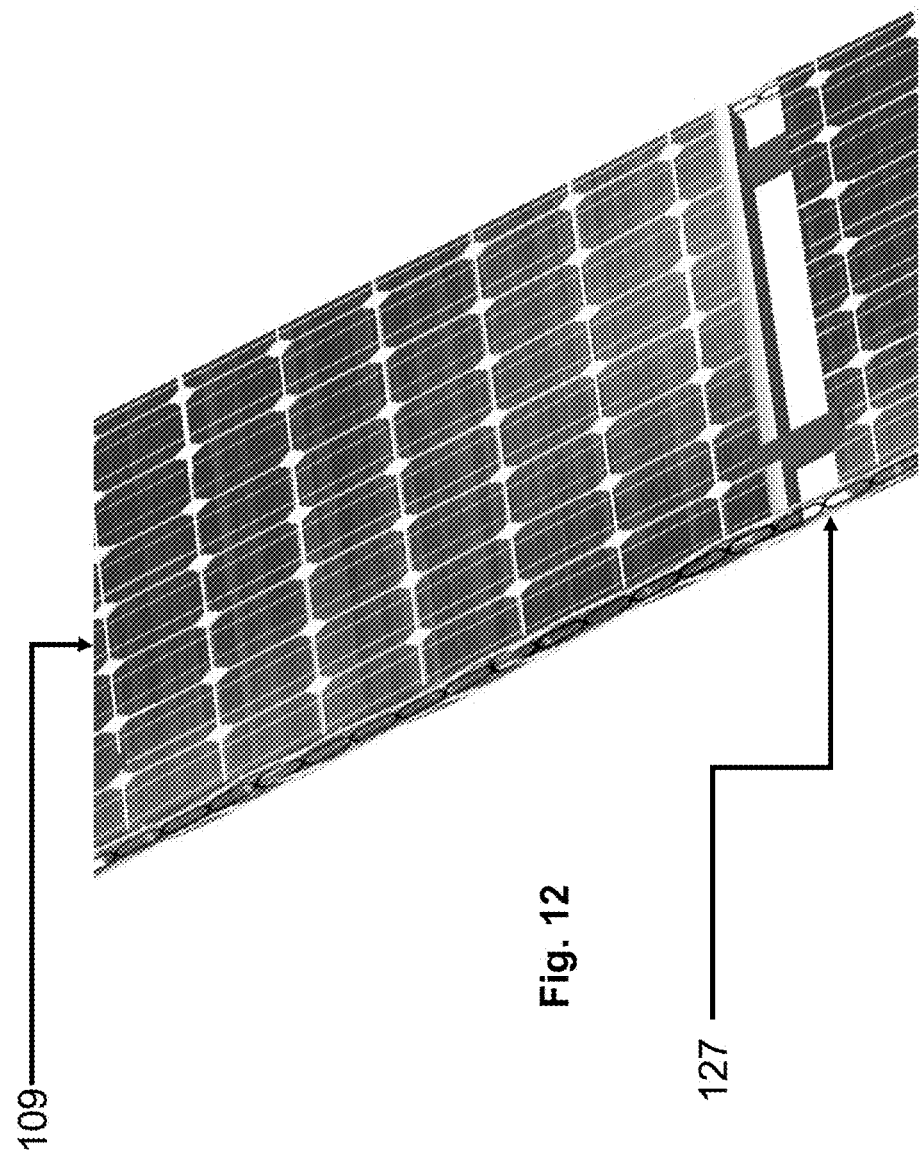
FIG. 12 illustrates the Counterweight's solar paneling and embedded rail lines traversing its side (isometric view).
Figure 13B:
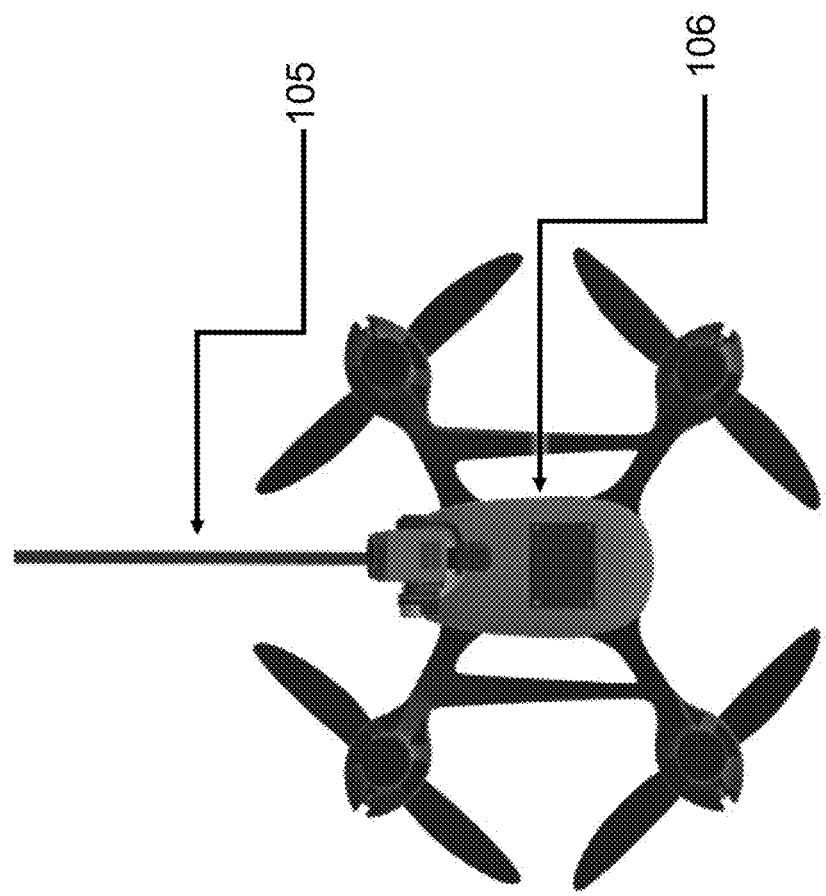
FIG. 13a illustrates the top view and FIG. 13b illustrates bottom view of the De-spooling Drone with the primary rail line composed of advanced materials (e.g., CNTs or material(s) with similar properties) in tow. The De-spooling Drones are maneuverable in space, and quad propellers provide maneuverability once the Drone and tether enter earth's atmosphere.
Figure 13A:
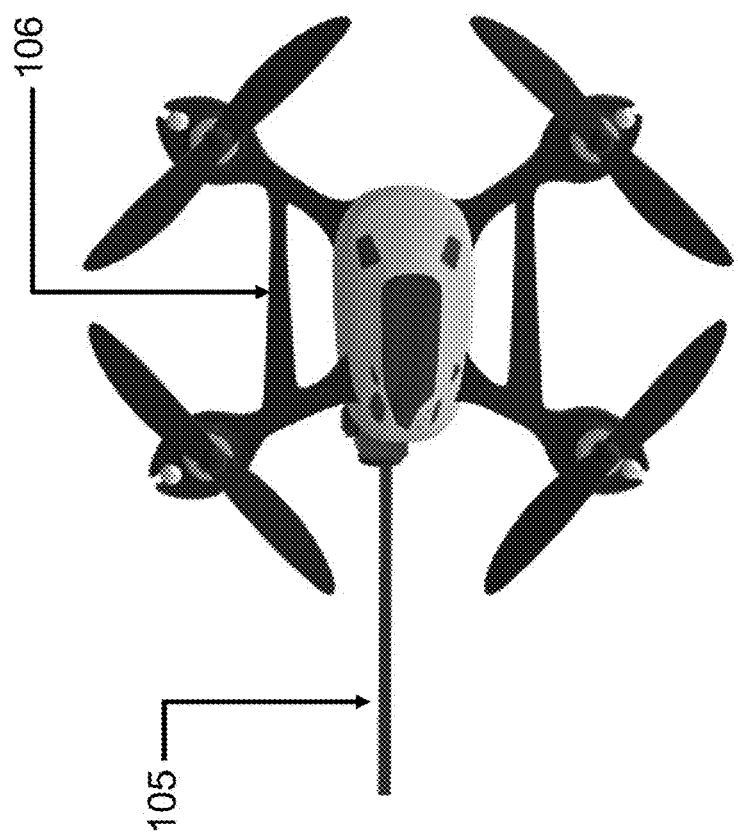
Figure 15:
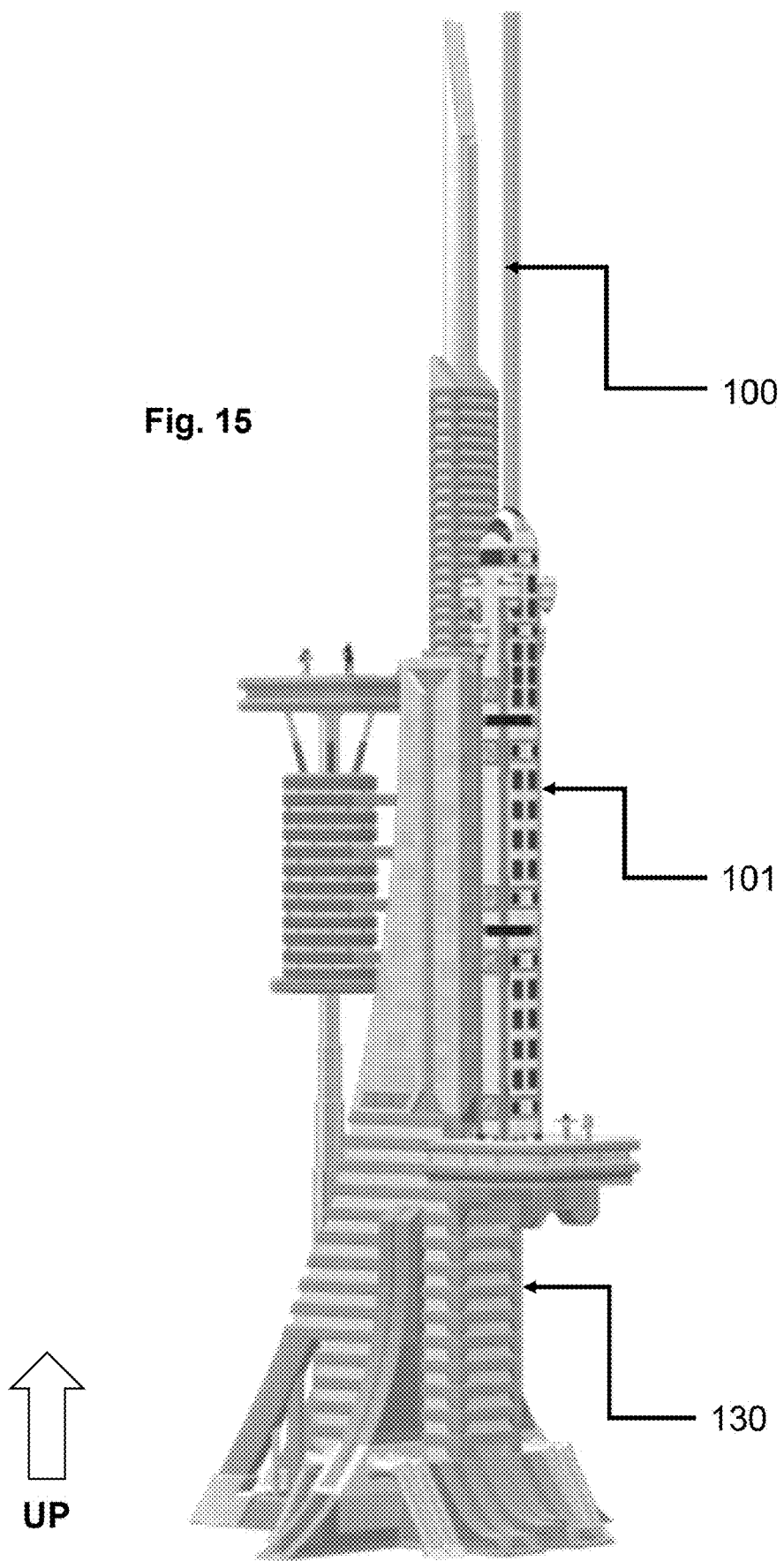
FIG. 15 illustrates Earth Landing Station (ELS) with HTV docked (portrait view). The ELS is the anchoring point for the tether assembly and serves as the control and logistics hub of the space railway system.
Figure 16C:
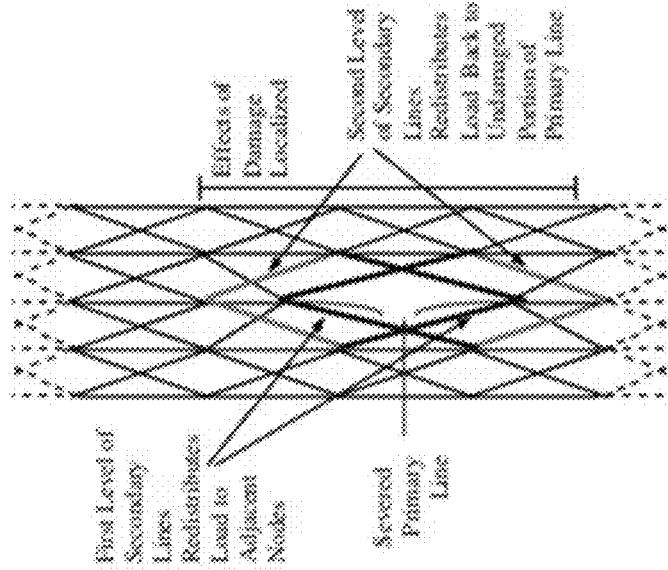
Figure 16B:
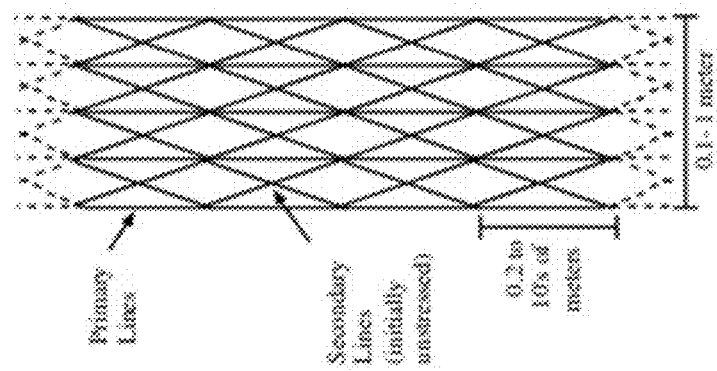
Figure 16A:
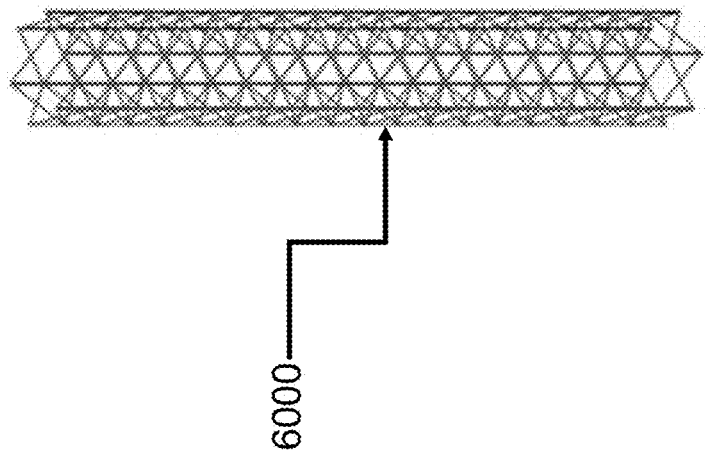
FIG. 16a illustrates a hybrid Hoytether.

The multi-railed tether/track (102) system will be installed using a stringing device, dubbed the Stringer (111), which is propelled by a double-sided linear induction motor (FIG. 10b). The Stringer will add the operational rail lines (FIG. 5a) in sufficient numbers to ensure redundancy for the MAGLEV system to ensure the safety for crew and cargo if one or more lines should fail. The added lines will also enhance the overall strength and electromagnetic capacity of the railway. The Stringer will carry an electrical conduit (112) through which the rail lines will pass, separated one from the other. The conduit will be secured on the primary (105) and secondary (107) rail lines near the Counterweight in HEO (FIG. 5b). The Stringer will also serve to replace existing lines for maintenance or upgrading purposes.

An individual multi-rail (124) consists of two fibers of quadrupled-braided advanced materials (113) with NFCs (114) interwoven in between. The advanced materials rail lines, when adequately multiplied by the stringing method proposed above, serve as platforms for acceleration and braking functions. In the embodiment using CNTs, the bulk density for commercially available single-ply CNT is 0.06 g/m3. The tensile strength of the CNT is of vital importance. The recommended strength of the CNT is 100 gigapascals for the space elevator. Tests done at the University of California Berkeley on CNT with a 95 percent purity demonstrated tensile strength as high as 300 gigapascals. A key difference in the invention versus the space elevator is the lack of direct traction on the tethered lines. This enables a quadruple braided CNT line to maintain its integrity despite its composition of aligned bundles of carbon fibrils hundreds of microns in diameter and millimeters long. Moreover, Space Railway™ can be fully operational in 5 to 10 years, even as carrying capacity is enhanced by the gradual thickening of the tether/track. In another embodiment, the rail lines are composed of advanced materials with properties like CNTs.

The total length ($R_g$+h) of Space Railway™ is determined in part by the mass of the Counterweight (103). Rail lines of 100,000 km are considered an optimal length. Taking p, T, and $A_s$ (when calculating for a single rail line), $R_g$+h=100,000 km, and, from Eq. (8), the taper ratio, the mass of the Counterweight is determined using Eq. (10). As additional rail lines are added to the multi-railed tether, additional counterweight panels (109) are added to the end of the line with these panels forming the bulk of the first payload sent into space by the operational HTV (101). If a shorter rail line than 100,000 km is desired, the weight of the Counterweight must increase proportionately. However, 100,000 km makes the railway long enough to also adequately function as a sling to launch spacecraft to distant planets by using the inherent rotational energy of the railway. With a railway length of 100,000 km, the HTV is estimated to reach a minimum speed of 7.76 km/sec which is comparable to conventional rocket speeds.

An inherent advantage of Space Railway™ becomes apparent when comparing the ideal energy cost of payload delivery into GEO with commercially available rocket launchers. The ideal cost in lifting the payload from the Earth's surface to GEO is the sum of the potential and kinetic energy costs. When Space Railway™ delivers its payload, the kinetic energy cost is saved because the railway automatically imparts the necessary velocity to the payload via its inherent rotational energy. This enables Space Railway™ launched spacecraft to go to Mars any day of the year without the delays of a launch window. Travel time dramatically decreases to 75-90 days to Mars versus nine months using current technology.

Another inherent advantage of the Space Railway™ design over any of the previous ideas is this: upon descent, the HTV will operate graphene or other high strength motors, or alternators, to convert kinetic energy to electricity in huge volumes. A gripping mechanism will make physical contact with the tether/track to initiate the kinetic energy. The advanced materials (e.g., CNTs or other materials with similar properties) of the tether/track have excellent conductivity properties, allowing the tether/track to serve as a transmission line to distribute electricity to power plants at the ELS and orbital station. The power production will dramatically reduce the cost of the next launch of an HTV.

The DLIM (125) has stators (120) composed of aerogel embedded with ferromagnetic nanoparticles. The traditional copper windings used as stator coils (121) are replaced with single strands of unbraided advanced materials (e.g., CNT or material(s) with similar properties) yarn. In a conventional MAGLEV train, three-phase alternating current (AC) (122) is controlled in the stator coils to generate traveling wave magnetic fields, which interact with the magnets aboard to realize electromagnetic thrust and synchronous motion. In the proposed invention, the three-phase AC passes through the DLIM to achieve thrust and motion over the advanced materials (e.g., CNT or material(s) with similar properties) fibers, which become electromagnetic when electrified, and serves as the rotor (123). Increasing the numbers, diameter, and embedding them with ferromagnetic nanoparticles enhances their electromagnetism. Scaled up sufficiently, the advanced materials (e.g., CNT or material(s) with similar properties) rail lines will become suitable for full acceleration and braking functions. Initial movement in some conventional MAGLEV trains is achieved by using retractable tires located in the undercarriage. The invention uses jet engines instead. As with current MAGLEV trains, a guidance, navigational, and control (GNC) system governs propulsion and deceleration of the HTV.

The HTV incorporates the double Halbach array (FIG. 11b) in its DLIM to provide lift, guidance, and propulsion as well as to mitigate the magnetic field effects on passengers and sensitive cargo. Sheets of advanced materials (e.g., graphene or materials with similar properties), used to protect the body from high-velocity space debris impacts, are also in the flooring as effective electromagnetic shields.

The HTV utilizes onboard solar-powered batteries for auxiliary power (i.e., for lighting, experiment containers, etc.) with the power source consisting of solar panels that are integrated into the outer hull of the vehicle.

The initial HTV design utilizes a hybrid propulsion/deceleration system consisting of a double-sided linear induction motor and jets for acceleration and deceleration. Later models may incorporate superconducting magnets and may or may not require rockets as supplemental accelerating or braking devices.

In the conventional MAGLEV trains, NFCs or composite coils are embedded in the wall of the guideway to reduce magnetic drag. Space Railway™ utilizes NFCs intertwined between two quadruple braided advanced materials (e.g., CNT or material(s) with similar properties) rails.

In the conventional MAGLEV trains, deceleration is achieved with the eddy current braking because the guideway magnets allow the opposite charged magnets in the train a fixed surface upon which to brake. When the onboard magnets travel along the rails, the eddy current is induced in the NFCs and the interaction between the magnets and the eddy current in the coils generate levitation, guidance, and drag forces. In the proposed invention, the advanced materials (e.g., CNT or material(s) with similar properties) rail lines also act as the guideway with the DLIM producing the eddy current braking effect supplemented by jet engines.

Using the lightweight, payload-only version HTV, additional weight is added to the Counterweight by lengthening the tether/track using additional panels (128). Deceleration is achieved by reversing the direction of the stator currents to produce braking forces with the drag forces from NFCs also contributing. In the passenger version HTV, failsafe braking is achieved with jet engines firing, jettison of nonessential cargo, and parachute deployment (4000).

Unlike the high velocity reentry of rocket-propelled vehicles, the HTV descends slowly, comfortably, and safely. The descent into Earth's gravitational sphere is slowed to under approximately 100 km/h or less at an altitude of 12,750 km above sea level. Below this point the gravitation pull of Earth increases exponentially according to the Inverse Square Law. The composition of the body of the HTV is ultra-lightweight consisting of tough polymers and sheets of advanced materials (e.g., graphene or materials with similar properties). Sheets of graphene have been tailored into bullet-proof vests and will be manufactured to protect passengers and payloads from high-velocity space debris impacts. Maneuvering rockets (5000) coupled with the DLIM allow the HTV to continue its controlled descent as its weight gradually returns to the level of standard gravity. The maneuvering rockets consist of cold gas thrusters. In the passenger version HTV, parachutes stored within the body are deployed as failsafe deceleration devices to guarantee a soft landing or in the event of a catastrophic braking or rail line failure. Failsafe braking is also achieved with jet engines firing and jettisoning of nonessential cargo. The combined jet engine-DLIM braking system mitigates the acceleration due to gravity to avoid descent speeds for the payload-only version HTV of greater than Mach 1.12 (1207 km/h) thereby circumventing a sonic boom. The passenger version HTV descends at much slower speeds to avoid passenger discomfort or anxiety.

Large quantities of kinetic energy from the descending HTV will be harvested and recycled using customized (e.g., graphene-based) magnetic technology with motors or generators to produce electricity. The electricity generated will be conducted (distributed) through the tether to a power plant at or near the launch site on earth or in space, where such energy can be consumed or stored, and thus available to lower the energy cost of the next launch dramatically. This same mechanism will also serve as a supplemental braking device as the spacecraft descends. Because the kinetic energy is harvested during the deceleration of the HTV, it may be considered predominantly clean energy.

ELS has a vertically oriented loading dock (130). The rail lines are anchored to the ELS platform. Electrodynamic Suspension (EDS) MAGLEV systems need to travel around 100 km/h to acquire enough induced currents for levitation. This is achieved in conventional MAGLEV trains with retractable rubber tires in the train's undercarriage. In contrast, in one embodiment, jets (118) serve as accelerators to begin the required initial movement necessary for the invention. In one embodiment, a lower-speed HTV using EMS for cargo transportation is employed. In another embodiment, a higher-speed EDS version for passenger transportation is used.

In one embodiment, the Counterweight (103) is a string of interconnected, flat, rectangular boxes. The Counterweight panels (128) are covered with solar panels on their two largest surfaces. The outer edges of the panels will contain non-tapered advanced materials (e.g., CNT or material(s) with similar properties) rails with NFCs (127) aiding in acceleration and braking of the HTV as it enters and exits the tether/track at its terminus. The design of the Counterweight is scalable to augment the length and weight of the initial space-launched Counterweight. The Counterweight will have a secondary purpose serving as a solar power generator ideally supplanting the need for a ground-based energy source.

Once the initial Space Railway™ line is operational, HTVs will deploy additional Counterweights, advanced materials (e.g., CNT or material(s) with similar properties) spools, and drones to establish a secondary rail line for Earth Station Two to allow one-way travel on each tether/track. This will also provide additional redundancy to the system in case one tether/track goes down for scheduled maintenance, repairs, or upgrades.

Figure 1:
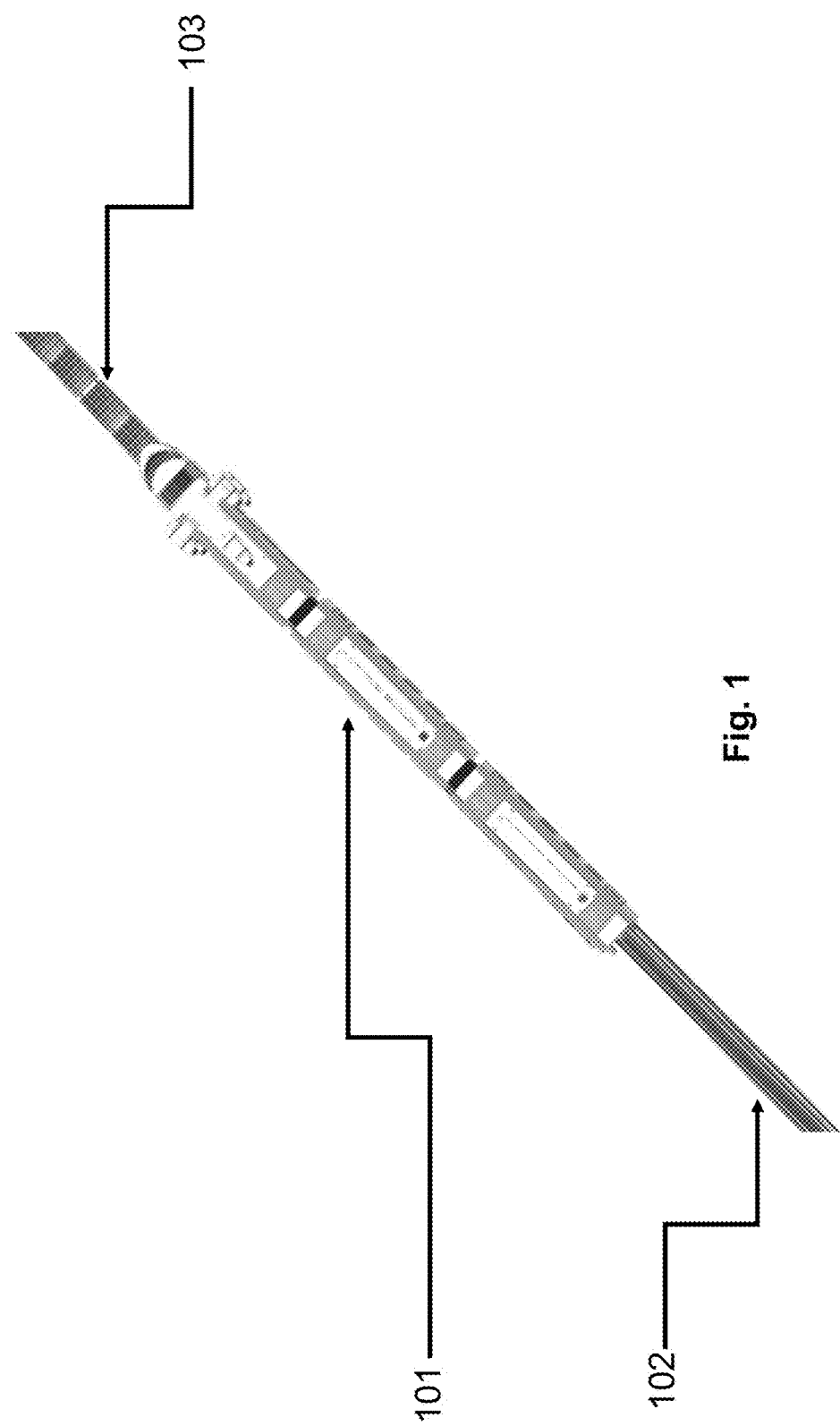
FIG. 1 illustrates a standard, three-car concept hybrid magnetic levitation-jet engine powered vehicle, or hybrid transport vehicle (HTV) for short, ascending the advanced materials (e.g., CNTs or material(s) with similar properties) tether toward the segmented, solar-paneled counterweight, shown to the right of the HTV located beyond GEO. The term hybrid is used in this invention to mean the combination of the primary moving system, which is the magnetic levitation, and the impulsion system, which is temporarily supplemented with either a set of secondary jet-engines or rocket powered thrust at near-to-earth locations in the flight envelop.
Figure 2:
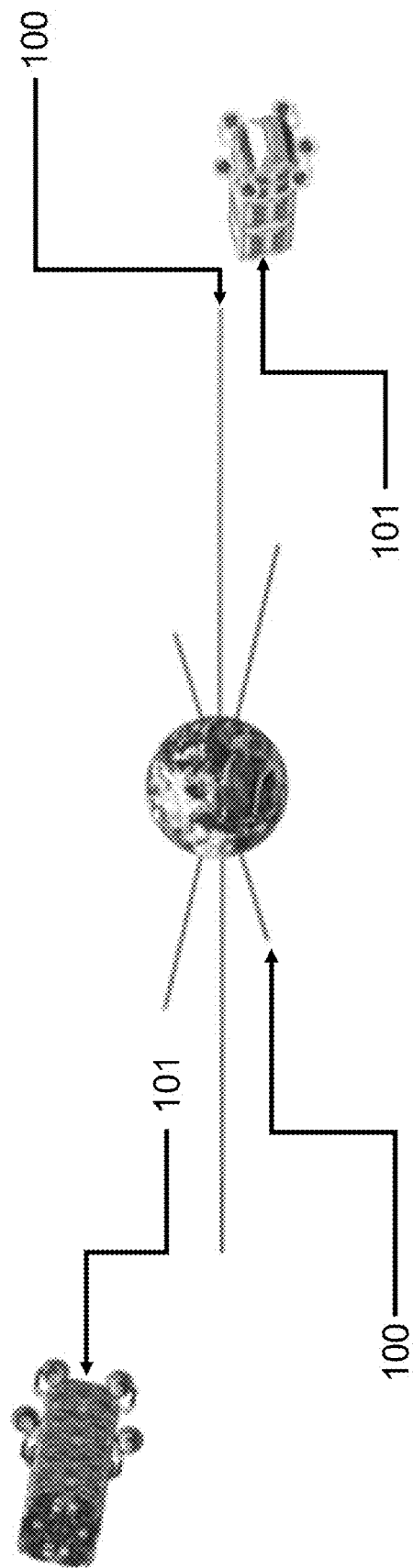
FIG. 2 illustrates the early stage worldwide system of six railway systems each originating at an Earth base and extending to beyond GEO.

The next phase is the establishment of railways at other terrestrial or oceanic bases around the Equator (FIG. 2). Equatorial sites are preferred because they will let the HTVs move faster at lower heights, reducing the overall length requirements for a railway. In addition, the Equator is far less prone to extreme weather. Tropical storms can neither form on, nor cross the Equator due to the Coriolis Effect and has virtually no lightning and little rain or wind, reducing weather complications. Possible equatorial rail line locations include Maldives, Ecuador, Kenya, Indonesia, Brazil, Gabon, and/or Sao Tome and Principe. An oceanic platform (130), akin to the ones used in offshore oil drilling and located in international waters, is ideal for U.S. military purposes. The U.S. Navy could even employ their larger vessels to serve as mobile platforms.

In one embodiment, the HTV would include solid propellant rockets may be mounted on the exterior of the HTV or retractable into the chassis of the vehicle to assist in acceleration and deceleration during deep space travel.

In one embodiment, the HTV has a rearward detachable caboose which has jets mounted on its exterior and contains the jet fuel in is interior. The detachable caboose has as its sole purpose the launch and landing of the main HTV. The caboose could also be deployed if the main HTV increases substantially in weight (e.g., passenger pick up, mining expedition, etc.) and requires extra deceleration power.

In another embodiment, the multi-railed tether/tracks and monorail are non-energized, since not all MAGLEV systems require an energized rail line and the heat energy produced by the solar panels may have a negative effect of the structural integrity or longevity of the tether/track(s). Such an embodiment may not necessitate solar panels in the Counterweight design.

In another embodiment, a portion of the solar array complex dedicated to microwave solar power generation beams down to a receiving station located in conjunction with the ELS. As described in the ELS, excess energy is shared with adjoining nations and communities.

In another embodiment, the HTV contains a gripping mechanism that grasps the advanced materials (e.g., CNT or material(s) with similar properties) lines and propels the vehicle up to the Karman line (100 km above Earth's mean sea level). Beyond the Karman line, the maglev propulsion system takes over the acceleration of the vehicle. This embodiment may or may not include jet engines.

In another embodiment, a tether/track is deployed starting at some point above the Karman line and out to some equal tension point without attaching the lower end to the Earth. A docking station for rocket or spin launched payload would serve as the point of transfer onto the HTV for passengers and payloads into higher orbits. This would allow for a substantially reduced CNT gigapascal requirement for the tether/track. In a single launch, the reduction in fuel weight would be replaced with an increased weight of payload. Rocket fuel for HEO satellite placement would be markedly reduced to LEO requirements. Higher orbital placement of satellites using current rocket launch systems could be achieved with substantially reduced fuel costs. Additionally, heavier orbiting satellites, such as the ISS, could be placed in higher orbits with significantly reduced orbit adjustment requirements. This embodiment is operational at the speed from which it was launched in LEO (roughly 17,000 mph or 7.59968 km/s) to mitigate the potential impacts from space debris of human origin that may be traveling at similar velocities and in similar orbital patterns. This mobile version allows for less fuel consumption by spacecraft attempting to dock with its HTV both the tether/track and the docking spacecraft will be traveling at relatively the same speed.

In another embodiment, the HTV is launch-assisted by a single rocket-equipped car, dubbed the caboose, located at the bottom of the HTV. The vehicle will be equipped with four rocket engines rated at 185,000 lb of thrust apiece for a total thrust of 740,000 lb of thrust. The rocket engines use RP-1, a highly refined form of kerosene, and liquid oxygen as rocket propellants in a gas-generator power cycle and will have vectored thrust capability to deflect rocket exhaust and heat outward from the tether/track. Once the HTV reaches Maglev propulsion speeds and can adequately assume primary propulsion, the caboose engine will cut off and detach from the main HTV and remain on the tether/track. It will then decelerate upward along the tether/track and once stopped, it will begin a descent back to the ELS. Speed brakes will deploy to slow the vehicle's descent. At a predetermined altitude above the ELS, the rocket engines will reignite and decelerate the caboose to a safe re-docking speed. Once docked at the ELS, the caboose will be prepped and fueled for another launch. The caboose will be a 100% reusable vehicle with a liquid hydrogen oxygen propellant capacity of 70,000 lb. This provides a burn time of 15 seconds for launch and 15 seconds burn for return profile (assuming a total burn rate of 2,200 lb/s), which is enough time to accelerate the HTV at maximum weight to greater than 100 km/h and leave enough fuel for redocking.

In another embodiment, flexible advanced materials form the Apex portion (e.g., approximately 5000 km) of the rail line, and a maneuverable Apex Station assists in the directional detachment and reattachment of the HTV from the rail line to facilitate deep space travel. Like the GEO Station, the Apex Station is developed over time to enhance service for HTV travel, payload, and passenger deployment as well as science, military, and tourist needs.

In another embodiment, one side of the DLIM sits atop a Telescopic Adjuster (7000) composed of a computer controller (800), an adjuster mechanism (850), and a telescoping component (650, 660) which compensates for the variations in the width of the tapered tether at launch/apex (901) and at GEO (902). Its telescoping action is controlled by a computer (800) that modulates an adjuster mechanism (850) which separates the adjoined DLIM plate (701) from its counterpart DLIM plate (702) by telescoping its smaller section (660) within its larger section (650).

In another embodiment, three separate tether/rail lines are anchored at three different Earth and/or oceanic bases on the same hemisphere. The three tethers are connected at a point at or above GEO. This will necessitate redesigning the HTV to be able to disembark from the tether or having the HTV come to a complete halt before reaching the connection point. The connection point would be a logical place for an orbital station.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed:

1. A space transportation system comprising:
   a transport vehicle;
   tethers;
   a space-based counterweight;
   a space-based station; and
   an earth landing station.

2. The space transportation system as claimed in claim 1, which further comprises a hybrid acceleration and deceleration equipment.

3. The space transportation system as claimed in claim 2, wherein said hybrid acceleration and deceleration equipment comprises magnetic levitation systems.

4. The space transportation system as claimed in claim 2, wherein said hybrid acceleration and deceleration equipment comprises jet engines.

5. The space transportation system as claimed in claim 3, wherein said magnetic levitation systems comprise double-sided linear induction motors.

6. The space transportation system as claimed in claim 1, wherein said transport vehicle comprises maneuvering rockets to navigate in a weightless environment for off-tether travel, and guidance, navigation, and control systems.

7. The space transportation system as claimed in claim 1, wherein said transport vehicle comprises solid propellant rockets to assist in acceleration and deceleration during deep space travel.

8. The space transportation system as claimed in claim 1, wherein said transport vehicle comprises a body and sheets of advanced materials protecting said body.

9. The space transportation system as claimed in claim 1, wherein said transport vehicle further comprises life support systems for passenger versions.

10. The space transportation system as claimed in claim 1, wherein said transport vehicle comprises failsafe braking equipment.

11. The space transportation system as claimed in claim 1, wherein said transport vehicle comprises a gripping mechanism that makes physical contact with said tethers to initiate kinetic energy for electricity production.

12. The space transportation system as claimed in claim 1, wherein said transport vehicle comprises an outer hull, solar panels that are integrated into said outer hull and onboard solar-powered batteries for auxiliary power or backup power operatively connected to said solar panels.

13. The space transportation system as claimed in claim 11, wherein said gripping mechanism grasps said tethers and propels said transport vehicle up said tethers to the Karman line (100 km above Earth's mean sea level).

14. The space transportation system as claimed in claim 5, wherein said tethers comprise individual rails and said double-sided linear induction motors comprise stators comprising aerogel embedded with ferromagnetic nanoparticles, stator coils comprising single strands of carbon nanotubes, and rotors comprising said individual rails from said tethers.

15. The space transportation system as claimed in claim 5, wherein said double-sided linear induction motors comprise double Halbach arrays for lift, guidance, and propulsion, wherein said arrays include a mitigation effect of the magnetic fields on passengers and sensitive cargo by said magnetic levitation equipment.

16. The space transportation system as claimed in claim 1, wherein said transport vehicle comprises sheets of advanced materials used to protect said transport vehicle from high-velocity space debris impacts and that serve as electromagnetic shields.

17. The space transportation system as claimed in claim 1, wherein said transport vehicle comprises a rearward detachable caboose having an interior and an exterior, and which further comprises jets mounted on said exterior and jet fuel contained within said interior.

18. The space transportation system as claimed in claim 1, wherein said tethers comprise a dual track comprising a pair of tracks of advanced materials.

19. The space transportation system as claimed in claim 18, wherein said dual track of advanced materials comprises quadrupled braided yarn.

20. The space transportation system as claimed in claim 18, wherein said dual track of advanced materials comprises an original diameter, wherein said dual track has an exponential taper ratio of 1.6 up to geostationary altitude, which then tapers exponentially back down to its original diameter at 100,000 km above sea level.

21. The space transportation system as claimed in claim 18, wherein each of said tracks is unspooled and returned individually to said earth landing station by a de-spooling device.

22. The space transportation system as claimed in claim 18, which further comprises additional rail lines positioned within said pair of tracks.

23. The space transportation system as claimed in claim 18, wherein each of said tracks are gradually thickened and united to form a single monorail.

24. The space transportation system as claimed in claim 23, wherein said monorail is non-energized.

25. The space transportation system as claimed in claim 24, wherein said monorail further comprises an electrodynamic tether to generate power, wherein said electrodynamic tether incorporates an insulated advanced conductive material to carry an electrical current.

26. The space transportation system as claimed in claim 18, wherein said tracks comprise a lower end and are deployed starting at some point above the Karman line and out to some equal tension point without attaching the lower end to the earth, and wherein said space transportation system further comprises a space-based station.

27. The space transportation system as claimed in claim 1, wherein said earth landing station comprises vertical loading docks for payload and passenger loading and unloading, and a deck wherein said tether is anchored.

28. The space transportation system as claimed in claim 1, wherein said space-based station further comprises a platform at approximately 35,786 km above sea level and a space station at approximately 100,000 km above sea level.

29. The space transportation system as claimed in claim 28, wherein said tethers comprise a dual rail track that comprises a first portion that extends between said platform and said space station.

30. The space transportation system as claimed in claim 28, wherein said platform further comprises a multi-purpose space station.

31. The space transportation system as claimed in claim 19, wherein said tracks will be unreeled using a de-spooling device to extend between said earth landing station on earth and said space-based counterweight positioned approximately 100,000 km.

32. The space transportation system as claimed in claim 1, wherein said tethers comprise at least two tracks each comprising two individual fibers of tapered, quadruple braided advanced materials with null flux coils intertwined between said fibers.

33. The space transportation system as claimed in claim 1, wherein said tethers comprise at least a pair of tracks of advanced materials.

34. The space transportation system as claimed in claim 1, wherein said tethers are woven according to a hybrid Hoytether configuration.

35. The space transportation system as claimed in claim 21, wherein said de-spooling device comprises a first drone to de-spool a first of the tethers and a second robotic drone to de-spool a second of said tethers.

36. The space transportation system as claimed in claim 1, wherein said counterweight comprises longitudinal edges and solar panels for energy production for said tethers, wherein said tethers comprise two individual fibers of non-tapered, quadruple braided advanced materials with null flux coils intertwined in between that are embedded on said longitudinal edges of said counterweight solar panels.

37. The space transportation system as claimed in claim 36, wherein said solar panels comprise a solar array complex, wherein a portion of said solar array complex is operatively connected to a receiving station to transmit excess power for supplemental use.

38. The space transportation system as claimed in claim 1, wherein said transport vehicle comprises customized motors or alternators for harvesting large quantities of kinetic energy during descent.

39. The space transportation system as claimed in claim 1, wherein said tethers further comprise advanced materials in a terminal portion, and which further comprises a maneuverable station that assists in the directional detachment and reattachment of the transport vehicle from the tethers to facilitate deep space travel.

40. The space transportation system in claim 1, wherein said transport vehicle comprises a deployment mechanism to deploy additional counterweights, advanced materials spools and drones.

41. The space transportation system as claimed in claim 5, wherein said double-sided linear induction motors each include two sides and which further comprise a telescopic adjuster comprising a computer control system that automatically modulates the space between the two sides of said double-sided linear induction motors to compensate for the tapering of said tethers.

\* \* \* \* \*